US012243737B2

(12) United States Patent
Hager

(10) Patent No.: US 12,243,737 B2
(45) Date of Patent: Mar. 4, 2025

(54) METHODS AND SYSTEMS OF FOURIER TRANSFORM MASS SPECTROMETRY

(71) Applicant: DH TECHNOLOGIES DEVELOPMENT PTE. LTD., Singapore (SG)

(72) Inventor: James Hager, Mississauga (CA)

(73) Assignee: DH TECHNOLOGIES DEVELOPMENT PTE. LTD., Singapore (SG)

( * ) Notice: Subject to any disclaimer, the term of this patent is extended or adjusted under 35 U.S.C. 154(b) by 325 days.

(21) Appl. No.: 17/754,968

(22) PCT Filed: Sep. 29, 2020

(86) PCT No.: PCT/IB2020/059069
§ 371 (c)(1),
(2) Date: Apr. 18, 2022

(87) PCT Pub. No.: WO2021/084339
PCT Pub. Date: May 6, 2021

(65) Prior Publication Data

US 2022/0384173 A1 Dec. 1, 2022

Related U.S. Application Data

(60) Provisional application No. 62/928,052, filed on Oct. 30, 2019.

(51) Int. Cl.
*H01J 49/42* (2006.01)

(52) U.S. Cl.
CPC ...... *H01J 49/4215* (2013.01); *H01J 49/4225* (2013.01); *H01J 49/427* (2013.01)

(58) Field of Classification Search
CPC ... H01J 49/4215; H01J 49/4225; H01J 49/427
See application file for complete search history.

(56) References Cited

U.S. PATENT DOCUMENTS 4,959,542 A * 9/1990 Stephens .................. G01D 5/38
250/237 G
5,734,161 A * 3/1998 Koster .................... H01J 49/40
250/282

(Continued)

FOREIGN PATENT DOCUMENTS

WO 2018142265 A1 8/2018

OTHER PUBLICATIONS

International Search Report and Written Opinion for PCT/IB2020/059069, mailed Dec. 22, 2020.

*Primary Examiner* — Nicole M Ippolito
(74) *Attorney, Agent, or Firm* — Potomac Law Group, PLLC; Reza Mollaaghababa; Ido Rabinovitch

(57) ABSTRACT

In various aspects, methods and systems disclosed herein are capable of operating a Fourier Transform Mass Spectrometry (FTMS) quadrupole mass analyzer in two operational modes: transmitting mode and trapping mode. In the trapping mode, ions are first trapped and cooled within the FTMS quadrupole mass analyzer prior to being subjected to an excitation pulse and ejected from the FTMS quadrupole mass analyzer for detection. However, in transmitting mode, the FTMS quadrupole mass analyzer may provide more rapid analysis because the excitation pulse is applied to the ions of an ion beam that is being continuously transmitted through the FTMS quadrupole mass analyzer.

20 Claims, 9 Drawing Sheets

(56) References Cited

U.S. PATENT DOCUMENTS

| | | | | |
|---|---|---|---|---|
| 2013/0048852 | A1 * | 2/2013 | Verenchikov | H01J 49/22 250/282 |
| 2015/0235828 | A1 * | 8/2015 | Campbell | H01J 49/4215 250/282 |
| 2018/0114685 | A1 * | 4/2018 | Hager | H01J 49/38 |

* cited by examiner

METHODS AND SYSTEMS OF FOURIER TRANSFORM MASS SPECTROMETRY

RELATED APPLICATION

This application claims priority to U.S. provisional application No. 62/928,052 filed on Oct. 30, 2019, entitled "Methods and Systems of Fourier Transform Mass Spectrometry," which is incorporated herein by reference in its entirety.

FIELD

The present teachings are generally related to mass spectrometry and, more particularly, to methods and systems incorporating a Fourier transform mass analyzer, which can be employed in a variety of different mass spectrometers

BACKGROUND

Mass spectrometry (MS) is an analytical technique for determining the elemental composition of test substances with both quantitative and qualitative applications. For example, MS can be used to identify unknown compounds, to determine the isotopic composition of elements in a molecule, and to determine the structure of a particular compound by observing its fragmentation, as well as to quantify the amount of a particular compound in the sample.

A Fourier transform is a mathematical algorithm that is used to transform a time-domain signal into the frequency domain or vice versa. In known techniques of Fourier transform mass spectrometry (FTMS), ions are excited and their oscillations are measured in the time domain. A Fourier transform is then used to transform the measured time domain oscillations of the ions into the frequency domain. Since the frequency of the oscillation of an ion is inversely proportional to the mass-to-charge ratio (m/z) of the ion, the frequencies found from the Fourier transform are converted to m/z values and a mass spectrum is produced.

Though FTMS can sometimes provide better resolving power and mass accuracy than other types of mass spectrometry, there remains a need for improved FTMS systems and methods providing improved resolution, sensitivity, and/or speed.

SUMMARY

In accordance with various aspects of the present teachings, improved methods and systems for performing FTMS are disclosed. Whereas known techniques of FTMS generally require relatively long steps for trapping and cooling ions prior to causing their excitation, various embodiments of the methods and systems disclosed herein are capable of operating a FTMS analyzer in two operational modes: transmitting mode and trapping mode. While in transmitting mode, for example, FTMS mass analyzers in accordance with various aspects of the present teachings may provide more rapid analysis relative to the trapping mode because the excitation pulse is applied to the ions of an ion beam that is being continuously transmitted through the FTMS mass analyzer. However, in an instance in which the mass spectrum calculated from the time-varying signal generated in transmitting mode provides insufficient intensity and/or resolution, for example, the FTMS mass analyzer can instead be triggered to operate in the trapping mode in which ions from an ion beam are first trapped and cooled within the FTMS mass analyzer prior to being subjected to an excitation pulse and the ejection of the excited ions from the FTMS mass analyzer for detection.

In accordance with various aspects of the present teachings, improved FTMS-based methods and systems are disclosed, which may provide improved resolution, sensitivity, and/or speed depending, for example, on the operational mode in which the FTMS mass analyzer is operated. In certain aspects, a method of performing mass analysis is provided, the method comprising triggering a quadrupole assembly to operate in one of a transmitting mode and a trapping mode and transmitting a plurality of ions into the quadrupole assembly. In various aspects, the quadrupole assembly comprises a quadrupole rod set and a plurality of auxiliary electrodes, the quadrupole rod set comprising an input end for receiving the ions and an output end through which ions exit the quadrupole rod set, wherein an exit lens is disposed adjacent the output end of the quadrupole rod set. When in the transmitting mode and while transmitting the ions into the quadrupole assembly, the ions are transmitted through the quadrupole assembly without trapping ions therein by applying at least one radio frequency (RF) voltage to each of the rods of the quadrupole rod set so as to generate a field for radial confinement of the ions (a DC rod offset and/or DC resolving voltage can additionally be applied to the rods of the quadrupole rod set in transmitting mode), and a voltage pulse is applied across the quadrupole assembly so as to excite radial oscillations of at least a portion of the ions being transmitted through the quadrupole at secular frequencies thereof, wherein fringing fields in proximity to said output end convert said radial oscillations of at least a portion of said excited ions into axial oscillations as said excited ions exit the quadrupole rod set. On the other hand, when in the trapping mode, the ions transmitted into the quadrupole assembly are trapped therein by applying i) at least one direct current (DC) voltage and at least one RF voltage to each of the quadrupole rods of the quadrupole rod set, ii) one or more DC voltages to the plurality of auxiliary electrodes, and iii) a DC voltage and an RF voltage to the exit lens while ions are being transmitted into the quadrupole assembly. After the ions are trapped and cooled within the quadrupole assembly, for example, a voltage pulse is applied across the quadrupole assembly so as to excite radial oscillations in at least a portion of the ions trapped within the quadrupole assembly at secular frequencies thereof. Excited ions are then axially ejected from the quadrupole rod set. In either the transmitting mode or trapping mode, the method may further comprise detecting at least a portion of said excited ions exiting the quadrupole rod set to generate a time-varying signal. In certain aspects, an analytical spectrum of the ions exiting the quadrupole rod set may be obtained from the time-varying signal. By way of example, an analytical spectrum can be obtained by performing a Fourier transform of the time-varying signal to generate a frequency-domain signal. In various aspects, the analytical spectrum can provide ion beam composition information including at least one of intensity of the ion beam and intensity of one or more ions of a particular m/z therein.

The quadrupole assembly may be triggered (e.g., manually or automatically such as under the control of a controller) to operate in one of the transmitting mode and trapping mode for a variety of reasons, including by way of non-limiting example by the selection by the user, based on a priori or empirical knowledge of a particular instrument, experiment and/or sample, and/or based on data obtained from a previous analysis. By way of example, the quadrupole assembly can be switched from operating in the transmitting mode to the trapping mode based on the results of a preceding analysis. In some aspects, the quadrupole assembly may be switched from the transmitting mode to the trapping mode in an instance in which the intensity of at least one ion of one or more particular m/z in the analytical spectrum is below a threshold. Additionally or alternatively, the quadrupole assembly may be switched from the transmitting mode to the trapping mode in order to increase the resolution of the analytical spectrum. By way of example, the quadrupole assembly may be switched from the transmitting mode to the trapping mode in an instance in the which the FWMH of at least one ion of one or more particular m/z in the analytical spectrum is above a threshold.

The quadrupole assembly may have a variety of configurations. In some aspects, for example, the quadrupole rod set may comprises a first pair of rods and a second pair of rods extending along a central longitudinal axis from the input end to the output end, wherein the rods of the quadrupole rod set are spaced apart from the central longitudinal axis such that the rods of each pair are disposed on opposed sides of the central longitudinal axis, while the plurality of auxiliary electrodes may comprise a pair of auxiliary electrodes extending along the central longitudinal axis on opposed sides thereof, with each of the auxiliary electrodes being interposed between a single rod of the first pair of rods and a single rod of the second pair of rods. In some related aspects, the voltage pulse may be applied across the rods of one of the first and second pairs of the quadrupole rod set. In some aspects, the voltage pulse may instead be applied across the auxiliary electrodes. In various aspects, the pair of auxiliary electrodes may be linear accelerator (LINAC) electrodes. Additionally or alternatively, the plurality of electrodes may also comprise a collar electrode surrounding the quadrupole rod set and disposed between the input end and the pair of auxiliary electrodes.

The amplitude and the duration of the voltage pulse applied during the transmitting mode or trapping mode can be selected, e.g., based on a particular application. By way of example, the voltage pulse can have a duration in a range of about 10 nanoseconds (ns) to about 1 millisecond, e.g., in a range of about 1 microsecond to about 100 microseconds, or in a range of about 5 microseconds to about 50 microseconds, or in a range of about 10 microseconds to about 30 microseconds. Further, the voltage pulse can have an amplitude, for example, in a range of about 10 volts to about 100 volts. For example, the amplitude of the voltage pulse can be in a range of about 20 volts to 30 volts. In some embodiments, the voltage pulse is applied as a dipolar voltage, i.e., via application of a positive voltage to one rod and a negative voltage to another (typically, a diagonally opposed rod). In other embodiments, the voltage pulse may be applied to a single rod. In various aspects, the voltage pulse applied during the transmitting mode and trapping mode can vary in amplitude and/or duration.

In certain aspects, the method can further comprise when in trapping mode, applying a pressure and gas flow within the quadrupole assembly to cool the ions trapped therein. In some aspects, the method can further comprise adjusting one or more of the DC voltages applied to the auxiliary electrodes and the DC voltage of the exit lens.

In certain aspects, the method can further comprise when in transmitting mode, applying a resolving DC voltage to the quadrupole rod set in order to selectively transmit through the quadrupole a portion of ions of a selected m/z range.

In accordance with various aspects of the present teachings, a mass spectrometer system is provided comprising an ion source for generating a plurality of ions and a quadrupole assembly comprising a quadrupole rod set and a plurality of auxiliary electrodes, said quadrupole rod set comprising an input end for receiving the ions and an output end through which ions exit the quadrupole rod set. An exit lens is disposed adjacent the output end of the quadrupole rod set. In various aspects, the system may also comprise one or more power supplies coupled to the quadrupole assembly and a detector for detecting at least a portion of ions exiting the quadrupole rod set so as to generate a time-varying signal. A controller operatively coupled to the various components of the system may also be provided, the controller configured to trigger the quadrupole assembly to operate in one of a transmitting mode and a trapping mode. In the transmitting mode, the controller may be configured to: control the one or more power supplies to apply at least one radio frequency (RF) voltage to each of the rods of the quadrupole rod set so as to generate a field for radial confinement of the ions to transmit the ions through the ions through the quadrupole assembly without trapping the ions therein; and control the one or more power supplies to apply a voltage pulse across the quadrupole assembly so as to excite radial oscillations of at least a portion of the ions being transmitted through the quadrupole at secular frequencies thereof, wherein fringing fields in proximity to said output end convert said radial oscillations of at least a portion of said excited ions into axial oscillations as said excited ions exit the quadrupole rod set. In the transmitting mode, the controller may be configured to: control the one or more power supplies to apply i) at least one direct current (DC) voltage and at least one RF voltage to each of the quadrupole rods of the quadrupole rod set, ii) one or more DC voltages to the plurality of auxiliary electrodes, and iii) a DC voltage and an RF voltage to the exit lens so as to trap the ions within the quadrupole assembly; control the one or more power supplies to apply a voltage pulse across the quadrupole assembly so as to excite radial oscillations of at least a portion of the ions trapped within the quadrupole assembly at secular frequencies thereof; and control the one or more power supplies to axially eject the excited ions from the quadrupole rod set. The controller may also be configured to generate an analytical spectrum of the ions exiting the quadrupole rod set from the time-varying signal in either the transmitting mode or the trapping mode. By way of example, the controller may be configured to perform a Fourier transform of said time-varying signal so as to generate a frequency-domain signal containing information of the ions excited by the voltage pulse in either the transmitting mode or the trapping mode.

In some aspects, the controller may be configured to switch the quadrupole assembly from the transmitting mode to the trapping mode based on a previous analytical spectrum. For example, the controller may be configured to switch the quadrupole assembly from the transmitting mode to the trapping mode in an instance in which the intensity of at least one ion of one or more particular m/z in the analytical spectrum is below a threshold. Alternatively or additionally, the controller may be configured to switch the quadrupole assembly from the transmitting mode to the trapping mode in order to increase the resolution of the analytical spectrum. For example, the controller may be configured to switch the quadrupole assembly from the transmitting mode to the trapping mode in an instance in the which the FWMH of at least one ion of one or more particular m/z in the analytical spectrum is above a threshold.

In certain aspects, the system may further comprise at least one gas inlet and at least one gas outlet, the controller further configured to control the gas inlet and gas outlet to adjust a pressure and gas flow within the quadrupole assembly. By way of example, the controller may be configured to control the gas inlet and gas outlet to maintain the quadrupole assembly at a pressure in the range of about $0.5\times10^{-5}$ to about $5\times10^{-5}$ Torr to cool the ions within the quadrupole assembly while in trapping mode.

In certain embodiments, a computer program product is disclosed that includes a non-transitory and tangible computer-readable storage medium whose contents include a program with instructions being executed on a processor so as to perform a method of mass spectrometry. The method includes providing a system, wherein the system comprises one or more distinct software modules, and wherein the distinct software modules comprise an operating mode selection module, a transmitting mode module, a trapping mode module, and an analysis module. The method further includes selecting one of a transmitting mode and a trapping mode to operate a quadrupole assembly and an exit lens associated therewith using the operating mode selection module, the quadrupole assembly comprising a quadrupole rod set and a plurality of auxiliary electrodes disposed between the rods of the quadrupole rod set, said quadrupole rod set comprising an input end for receiving the ions and an output end through which ions exit the quadrupole rod set, wherein the exit lens is disposed adjacent the output end of the quadrupole rod set. When in transmitting mode, the transmitting mode module is used to transmit the ions through the quadrupole assembly without trapping ions therein by applying at least one radio frequency (RF) voltage to each of the rods of the quadrupole rod set so as to generate a field for radial confinement of the ions; and apply a voltage pulse across the quadrupole assembly so as to excite radial oscillations of at least a portion of the ions being transmitted through the quadrupole at secular frequencies thereof, wherein fringing fields in proximity to said output end convert said radial oscillations of at least a portion of said excited ions into axial oscillations as said excited ions exit the quadrupole rod set. When in trapping mode, the trapping mode module is used to trap the ions transmitted into the quadrupole assembly by applying i) at least one direct current (DC) voltage and at least one RF voltage to each of the quadrupole rods of the quadrupole rod set, ii) one or more DC voltages to the plurality of auxiliary electrodes, and iii) a DC voltage and an RF voltage to the exit lens while transmitting the ions into the quadrupole assembly; apply a voltage pulse across the quadrupole assembly so as to excite radial oscillations of at least a portion of the ions trapped within the quadrupole assembly at secular frequencies thereof; and axially eject the excited ions from the quadrupole rod set. The analysis module is used to generate an analytical spectrum of the ions exiting the quadrupole rod set from a time-varying signal provided by a detector in either the transmitting mode or the trapping mode.

Further understanding of various aspects of the present teachings can be obtained by reference to the following detailed description in conjunction with the associated drawings, which are described briefly below.

DETAILED DESCRIPTION

Figure 1:
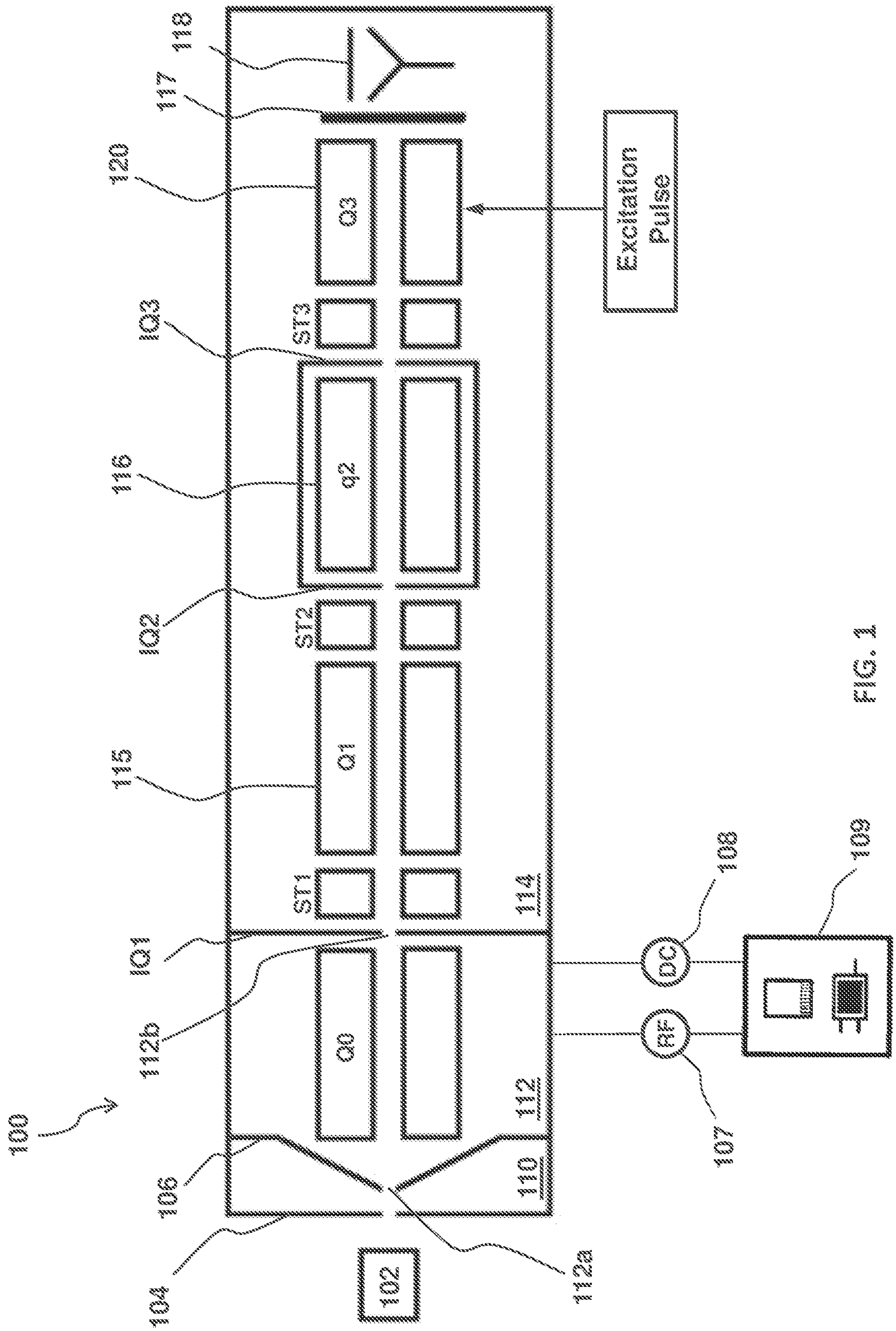
FIG. 1 schematically depicts an exemplary mass spectrometer system in accordance with various aspects of applicant's teachings.

It will be appreciated that for clarity, the following discussion will explicate various aspects of embodiments of the applicant's teachings, while omitting certain specific details wherever convenient or appropriate to do so. For example, discussion of like or analogous features in alternative embodiments may be somewhat abbreviated. Well-known ideas or concepts may also for brevity not be discussed in any great detail. The skilled person will recognize that some embodiments of the applicant's teachings may not require certain of the specifically described details in every implementation, which are set forth herein only to provide a thorough understanding of the embodiments. Similarly, it will be apparent that the described embodiments may be susceptible to alteration or variation according to common general knowledge without departing from the scope of the disclosure. The following detailed description of embodiments is not to be regarded as limiting the scope of the applicant's teachings in any manner. As used herein, the terms "about" and "substantially equal" refer to variations in a numerical quantity that can occur, for example, through measuring or handling procedures in the real world; through inadvertent error in these procedures; through differences in the manufacture, source, or purity of compositions or reagents; and the like. Typically, the terms "about" and "substantially" as used herein means greater or lesser than the value or range of values stated by 1/10 of the stated values, e.g., ±10%. For instance, a concentration value of about 30% or substantially equal to 30% can mean a concentration between 27% and 33%. The terms also refer to variations that would be recognized by one skilled in the art as being equivalent so long as such variations do not encompass known values practiced by the prior art.

Exemplified herein are FTMS-based methods and systems which may provide improved resolution, sensitivity, and/or speed of analysis depending, for example, on the operational mode that the FTMS mass analyzer is operated. Whereas known FTMS-based techniques generally require trapping and cooling ions prior to causing their coherent excitation, methods and systems disclosed herein may not only operate a quadrupole assembly in a trapping mode (in which trapped ions are subject to an excitation pulse) but may alternatively operate the quadrupole assembly in the more-rapid transmitting mode (in which an ion beam being continuously transmitted through the quadrupole assembly are subject to an excitation pulse). That is, quadrupole assemblies in accordance with the present teachings may be triggered (e.g., manually or automatically such as under the control of a controller) to operate in one of the transmitting mode and trapping mode depending, for example, on user preference, experience with a particular instrument, experiment and/or sample, and/or based on data obtained from a previous mass spectrometric analysis. By way of example, if the experimental results from a quadrupole assembly operating in transmitting mode indicates insufficient intensity and/or resolution, the quadrupole assembly can be triggered to operate in the trapping mode such that a larger population of trapped ions may be concurrently subjected to the relatively-longer transient electric field caused by the excitation pulse. In this manner, the quadrupole assembly may be configured to switch between an operational mode providing very rapid data acquisition (e.g., about 0.5-1 kHz) and an operational mode providing increased sensitivity and/or spectral resolution but at relatively slower data acquisition rates (e.g., about 10 Hz).

While systems, devices, and methods described herein can be used in conjunction with many different mass spectrometry systems, an exemplary mass spectrometry system 100 for use in accordance with the present teachings is illustrated schematically in FIG. 1. It should be understood that mass spectrometry system 100 represents only one possible configuration and that other mass spectrometry systems modified in accordance with the present teachings can also be used as well. As shown schematically in the exemplary embodiment depicted in FIG. 1, the mass spectrometry system 100 generally includes an ion source 102 for generating ions within an ionization chamber 110, a collision focusing ion guide Q0 housed within a first vacuum chamber 112, a downstream vacuum chamber 114 containing one or more mass analyzers (one of which is a quadrupole assembly 120 in accordance with the present teachings), and a controller 109 for controlling the operation of the various components of the system 100 as otherwise discussed below. Though the exemplary second vacuum chamber 114 is depicted as housing three quadrupoles (i.e., elongated rod sets mass filter 115 (also referred to as Q1), collision cell 116 (also referred to as q2), and quadrupole assembly 120), it will be appreciated that more or fewer mass analyzers or ion processing elements can be included in systems in accordance with the present teachings. Though mass filter 115 and collision cell 116 are generally referred to herein as quadrupoles (that is, they have four rods) for convenience, the elongated rod sets 115, 116 may be other suitable multipole configurations. For example, collision cell 116 can comprise a hexapole, octapole, etc. It will also be appreciated that the mass spectrometry system can comprise any of triple quadrupoles, linear ion traps, quadrupole time of flights, Orbitrap or other Fourier transform mass spectrometry systems, all by way of non-limiting examples.

Each of the various stages of the exemplary mass spectrometer system 100 will be discussed in additional detail with reference to FIG. 1. Initially, the ion source 102 is generally configured to generate ions from a sample to be analyzed and can comprise any known or hereafter developed ion source modified in accordance with the present teachings. Non-limiting examples of ion sources suitable for use with the present teachings include atmospheric pressure chemical ionization (APCI) sources, electrospray ionization (ESI) sources, continuous ion sources, a pulsed ion source, an inductively coupled plasma (ICP) ion source, a matrix-assisted laser desorption/ionization (MALDI) ion source, a glow discharge ion source, an electron impact ion source, a chemical ionization source, or a photo-ionization ion source, among others.

Ions generated by the ion source 102 are initially drawn through an aperture in a sampling orifice plate 104. As shown, ions pass through an intermediate pressure chamber 110 located between the orifice plate 104 and the skimmer 106 (e.g., evacuated to a pressure approximately in the range of about 1 Torr to about 4 Torr by a mechanical pump (not shown)) and are then transmitted through an inlet orifice 112*a* to enter a collision focusing ion guide Q0 so as to generate a narrow and highly focused ion beam. In various embodiments, the ions can traverse one or more additional vacuum chambers and/or quadrupoles (e.g., a QJet® quadrupole or other RF ion guide) that utilize a combination of gas dynamics and radio frequency fields to enable the efficient transport of ions with larger diameter sampling orifices. The collision focusing ion guide Q0 generally includes a quadrupole rod set comprising four rods surrounding and parallel to the longitudinal axis along which the ions are transmitted. As is known in the art, the application of various RF and/or DC potentials to the components of the ion guide Q0 causes collisional cooling of the ions (e.g., in conjunction with the pressure of vacuum chamber 112), and the ion beam is then transmitted through the exit aperture in IQ1 (e.g., an orifice plate) into the downstream mass analyzers for further processing. The vacuum chamber 112, within which the ion guide Q0 is housed, can be associated with a pump (not shown, e.g., a turbomolecular pump) operable to evacuate the chamber to a pressure suitable to provide such collisional cooling. For example, the vacuum chamber 112 can be evacuated to a pressure approximately in the range of about 1 mTorr to about 30 mTorr, though other pressures can be used for this or for other purposes. For example, in some aspects, the vacuum chamber 112 can be maintained at a pressure such that pressure×length of the quadrupole rods is greater than $2.25\times10^{-2}$ Torr-cm. The lens IQ1 disposed between the vacuum chamber 112 of Q0 and the adjacent chamber 114 isolates the two chambers and includes an aperture 112*b* through which the ion beam is transmitted from Q0 into the downstream chamber 114 for further processing.

Vacuum chamber 114 can be evacuated to a pressure than can be maintained lower than that of ion guide chamber 112, for example, in a range from about $1\times10^{-6}$ Torr to about $1.5\times10^{-3}$ Torr. For example, the vacuum chamber 114 can be maintained at a pressure in a range of about $8\times10^{-5}$ Torr to about $1\times10^{-4}$ Torr (e.g., $5\times10^{-5}$ Torr to about $5\times10^{-4}$ Torr) due to the pumping provided by a turbomolecular pump and/or through the use of an external gas supply for controlling gas inlets and outlets (not shown), though other pressures can be used for this or for other purposes. The ions enter the quadrupole mass filter 115 via stubby rods ST1. As will be appreciated by a person of skill in the art, the quadrupole mass filter 115 can be operated as a conventional transmission RF/DC quadrupole mass filter that can be operated to select an ion of interest or a range of ions of interest. By way of example, the quadrupole mass filter 115 can be provided with RF/DC voltages suitable for operation in a mass-resolving mode. As should be appreciated, taking the physical and electrical properties of the rods of mass filter 115 into account, parameters for an applied RF and DC voltage can be selected so that the mass filter 115 establishes a transmission window of chosen m/z ratios, such that these ions can traverse the mass filter 115 largely unperturbed. Ions having m/z ratios falling outside the window, however, do not attain stable trajectories within the quadrupole and can be prevented from traversing the mass filter 115. It should be appreciated that this mode of operation is but one possible mode of operation for mass filter 115. By way of example, in some aspects, the mass filter 115 can be operated in a RF-only transmission mode in which a resolving DC voltage is not utilized such that substantially all ions of the ion beam pass through the mass filter 115 largely unperturbed (e.g., ions that are stable at and below Mathieu parameter q=0.908). Alternatively, the lens IQ2 between mass filter 115 and collision cell 116 can be maintained at a much higher offset potential than the rods of mass filter 115 such that the quadrupole mass filter 115 be operated as an ion trap. Moreover, as is known in the art, the potential applied to the entry lens IQ2 can be selectively lowered (e.g., mass selectively scanned) such that ions trapped in mass filter 115 can be accelerated into the collision cell 116, which could also be operated as an ion trap, for example.

Ions transmitted by the mass filter 115 can pass through post-filter stubby rods ST2 (e.g., a set of RF-only stubby rods that improves transmission of ions exiting a quadrupole) and lens IQ2 into the quadrupole 116, which as shown can be disposed in a pressurized compartment and can be configured to operate as a collision cell at a pressure approximately in the range of from about 1 mTorr to about 30 mTorr, though other pressures can be used for this or for other purposes. A suitable collision gas (e.g., nitrogen, argon, helium, etc.) can be provided by way of a gas inlet (not shown) to thermalize and/or fragment ions in the ion beam. In some embodiments, application of suitable RF/DC voltages to the quadrupole 116 and entrance and exit lenses IQ2 and IQ3 can provide optional mass filtering and/or trapping. Similarly, the quadrupole 116 can also be operated in a RF-only transmission mode such that substantially all ions of the ion beam pass through the collision cell 116 largely unperturbed.

Ions that are transmitted by collision cell 116 pass into the adjacent quadrupole assembly 120, which as shown in FIG. 1 is bounded upstream by IQ3 and stubby rods ST3 and downstream by the exit lens 117. The quadrupole assembly 120 can be operated at a decreased operating pressure relative to that of collision cell 116, for example, at a pressure in a range from about $1\times10^{-6}$ Torr to about $1.5\times10^{-3}$ Torr (e.g., about $5\times10^{-5}$ Torr), though other pressures can be used for this or for other purposes.

As discussed in detail below with reference to FIGS. 2 and 3A-C, the quadrupole assembly 120 includes a quadrupole rod set and a plurality of auxiliary electrodes. Generally, the quadrupole assembly 120 is configured to operate in two modes through the application of various electrical signals to the components of the assembly 120. For example, the application of RF voltages to the quadrupole rods (with or without a resolving DC voltage) can provide radial confinement of the ions as they pass through the quadrupole rod set in the transmitting mode (e.g., without trapping), while the application of RF and DC voltages to various components of the quadrupole assembly 120 can enable the ions to be trapped and cooled therewithin (instead of being transmitted directly therethrough). As shown in FIG. 1 with respect to collision cell 116, the quadrupole assembly 120 can also be housed within a pressurized compartment having gas inlets and outlets (not shown) that enable independent control of pressure and/or gas flow rates (e.g., relative to vacuum chamber 114) to enable cooling ions trapped within the quadrupole assembly 120.

Moreover, when in the transmitting mode and while the ion beam is being received from collision cell 116 and being continuously transmitted through the quadrupole assembly 120 (e.g., without trapping the ions), the application of an excitation pulse across the quadrupole assembly 120 can excite radial oscillations of at least a portion of the ions (and preferably all) such that fringing fields in proximity to the output end of the quadrupole assembly 120 can convert the radial oscillations into axial oscillations as the excited ions exit the quadrupole assembly 120 through exit lens 117 for detection by detector 118, thereby generating a time-varying ion signal. On the other hand, in trapping mode, after the ions transmitted into the quadrupole assembly 120 are trapped and cooled, the application of an excitation pulse across the quadrupole assembly 120 can excite radial oscillations in the trapped ions, which may then be axially ejected from the quadrupole assembly 120 through exit lens 117. Detection by detector 118 of the ions ejected from the quadrupole assembly 120 in trapping mode can also generate a time-varying ion signal. As discussed in further detail below, the system controller 109, in communication with the detector 118, can operate (e.g., via one or more processors) on the time-varying ion signal generated in either the transmitting mode or trapping mode to derive a mass spectrum of the detected ions. In some aspects, the controller may trigger the quadrupole assembly 120 to be operated in a different operational mode (e.g., under the control of a system controller 109) following the interrogation of the ion beam for the generation of another analytical spectrum.

As shown, the exemplary mass spectrometry system 100 of FIG. 1 additionally includes one or more power sources 107, 108 that can be controlled by the controller 109 so as to apply electric potentials with RF and/or DC components to the quadrupole rods, various lenses, and auxiliary electrodes so as to configure the elements of the mass spectrometry system 100 for various different modes of operation depending on the particular MS application. It will be appreciated that the controller 109 can also be linked to the various elements in order to provide joint control over the executed timing sequences. Accordingly, the controller 109 can be configured to provide control signals to the power source(s) supplying the various components in a coordinated fashion in order to control the mass spectrometry system 100 as otherwise discussed herein. By way of example, the controller 109 may include a processor for processing information, data storage for storing mass spectra data, and instructions to be executed, all by way of non-limiting example. It will be appreciated that though controller 109 is depicted as a single component, one or more controllers (whether local or remote) may be configured to cause the mass spectrometer system 100 to operate in accordance with any of the methods described herein. Additionally, in some implementations, the controller 109 may be operatively associated with an output device such as a display (e.g., a cathode ray tube (CRT) or liquid crystal display (LCD) for displaying information to a computer user) and/or an input device including alphanumeric and other keys and/or cursor control for communicating information and command selections to the processor (e.g., the selection of an operational mode). Consistent with certain implementations of the present teachings, the controller 109 executes one or more sequences of one or more instructions contained in data storage, for example, or read into memory from another computer-readable medium, such as a storage device (e.g., a disk). The one or more controller(s) may take a hardware or software form, for example, the controller 109 may take the form of a suitably programmed computer, having a computer program stored therein that is executed to cause the mass spectrometer system 100 to operate as otherwise described herein, though implementations of the present teachings are not limited to any specific combination of hardware circuitry and software. Various software modules associated with the controller 109, for example, may execute programmable instructions to perform the exemplary methods described herein as discussed below with reference to FIG. 7.

With reference now to FIGS. 2A-D, a quadrupole assembly 220 comprising a quadrupole rod set 222 and a plurality of auxiliary electrodes 230*a-c* in accordance with various aspects of the present teachings is depicted. As shown, the quadrupole rod set 222 consists of four parallel rod electrodes 222*a-d* that are disposed around and parallel to a central longitudinal axis (Z) extending from an input end (e.g., toward ion source 102) to an outlet end (e.g., toward detector 118). As best shown in cross-section in FIGS. 2B-D, the rods 222*a-d* have a cylindrical shape (i.e., a circular cross-section) with the innermost surface of each rod 222*a-d* disposed equidistant from the central axis (Z) and with each of the rods 222*a-d* being equivalent in size and shape to one another. The rods 222*a-d* are generally grouped into two pairs of rods (e.g., a first pair comprising rods 222*a,c* disposed on the X-axis and a second pair comprising rods 222*b,d* disposed on the Y-axis), with rods of each pair being disposed on opposed sides of the central axis (Z) and to which identical electrical signals can be applied. The minimum distance between each of the rods 222*a-d* and the central axis (Z) is defined by a distance $r_0$ such that the innermost surface of each rod 222*a-d* is separated from the innermost surface of the other rod in its rod pair across the central longitudinal axis (Z) by a minimum distance of $2r_0$. It will be appreciated that though the rods 222*a-d* are depicted as cylindrical, the cross-sectional shape, size, and/or relative spacing of the rods 222*a-d* may be varied as is known in the art. For example, in some aspects, the rods 222*a-d* can exhibit a radially internal hyperbolic surface according to the equation $x^2-y^2=r_0^2$, where $r_0$ (the field radius) is the radius of an inscribed circle between the electrodes in order to generate quadrupole fields.

The rods 222*a-d* are electrically conductive (i.e., they can be made of any conductive material such as a metal or alloy) and can be coupled to one or more power supplies such that one or more electrical signals can be applied to each rod 222*a-d* alone or in combination. As is known in the art, the application of radiofrequency (RF) voltages to the rods 222*a-d* of the quadrupole rod set 222 can be effective to generate a quadrupolar field that radially confines the ions as they pass through the quadrupole rod set 222, with or without a selectable amount of a resolving DC voltage applied concurrently to one or more of the quadrupole rods 222*a-d*. Generally as is known in the art, in order to produce a radially-confining quadrupolar field for at least a portion of the ions being transmitted through the quadrupole rod set 222, the power system can apply an electric potential to the first pair of rods 222*a,c* of a rod offset voltage (RO)+[U−V cos Ωt], where U is the magnitude of the resolving DC electrical signal provided by DC voltage source 208*a*, V is the zero-to-peak amplitude of the RF signal provided by RF voltage source 207*a*, Ω is the angular frequency of the RF signal, and t is time. The power system can also apply an electric signal to the second pair of rods 222*b,d* of RO−[U−V cos Ωt] such that the electrical signals applied to the first pair of rods 222*a,c* and the second pair of rods 222*b,d* differ in the polarity of the resolving DC signal (i.e., the sign of U), while the RF portions of the electrical signals would be 180° out of phase with one another. It will be appreciated by a person skilled in the art that the quadrupole rod set 222 can thus be configured as a quadrupole mass filter that selectively transmits ions of a selected m/z range by a suitable choice of the DC/RF ratio. Alternatively, it will be appreciated that the quadrupole rod set 222 can be operated in a RF-only transmission mode in which a DC resolving voltage (U) is not applied such that ions entering the quadrupole rod set 222 that are stable at and below Mathieu parameter q=0.908 would be transmitted through the quadrupole rod set 222 without striking the rods 222*a-d*.

In addition to being electrically coupled to the RF voltage source 207*a* and/or the DC voltage sources 208*a* for operating the quadrupole rods in RF-only or mass-filter mode as discussed above, one or more of the quadrupole rods 222*a-d* of quadrupole assembly 220 can be coupled to a pulsed voltage source 208*c* for applying a temporally-short excitation pulse across the quadrupole assembly 220 in either transmitting or trapping mode as discussed otherwise herein. In various embodiments, the excitation pulse can comprise a very narrow dipolar excitation pulse having a sharp leading edge. For example, the pulsed voltage source 208*c* can apply a dipolar voltage pulse to the X rods (i.e., the first pair of rods 222*a,c*), though in other embodiments, the dipolar pulsed voltage can instead be applied to the Y rods (i.e., the second pair of rods 222*b,d*). In this case, a dipolar pulse means that a positive voltage is applied to one rod (e.g., rod 222*a*) of a rod pair, while at the same time a negative voltage of the same amplitude is applied to the other rod (e.g., rod 222*c*) of the rod pair.

In general, a variety of pulse amplitudes and durations can be employed. In many embodiments, the longer the pulse width, the smaller the pulse amplitude that is utilized to generate the radial oscillations in accordance with the present teachings. In various embodiments, the amplitude of the applied voltage pulse can be, for example, in a range of about 5 volts to about 100 volts, or in a range of about 20 volts to about 30 volts, though other amplitudes can also be used. Further, the duration of the voltage pulse (pulse width) can be, for example, in a range of about 10 nanoseconds (ns) to about 1 millisecond, e.g., in a range of about 1 microsecond to about 100 microseconds, or in a range of about 1 microsecond to about 5 microseconds, though other pulse durations can also be used.

The waveform associated with the voltage pulse can have a variety of different shapes with the goal of providing a rapid broadband excitation signal in accordance with the present teachings. By way of example, an exemplary voltage pulse may comprise a square temporal shape. In some embodiments, the rise time of the voltage pulse, i.e., the time duration that it takes for the voltage pulse to increase from zero voltage to reach its maximum value, can be, for example, in a range of about 1 to 100 nsec. In other embodiments, the voltage pulse can have a different temporal shape.

Figure 2A:
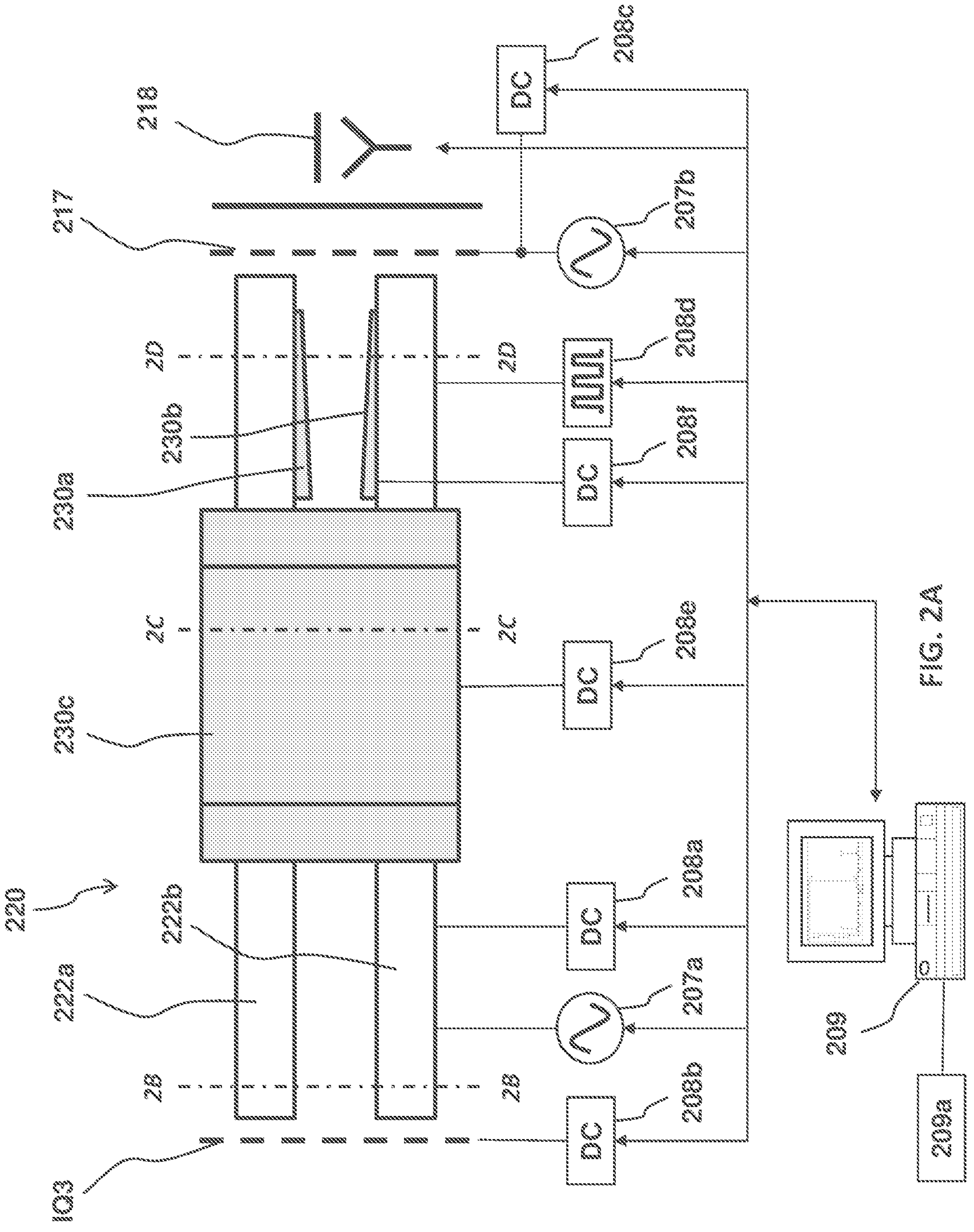
FIG. 2A schematically depicts an exemplary quadrupole assembly suitable for use in the system of FIG. 1 in accordance with various aspects of applicant's teachings.

With specific reference to FIG. 2A, an input lens IQ3 is shown disposed in proximity to the input end of the quadrupole rod set 222 (ST3 of FIG. 1 is omitted in FIG. 2A for clarity) and an exit lens 217 is disposed in proximity of the output end of the quadrupole rod set 222. DC voltage sources 208*b,c*, operating under the control of the controller 209, can respectively apply DC voltages to the input lens IQ3 and the exit lens 217 (e.g., in range of about 1 to 50 V attractive relative to the DC offset applied to the quadrupole rods 222*a-d*). In some embodiments, the DC voltage applied to the input lens IQ3 causes the generation of an electric field that facilitates the entry of the ions into the quadrupole rod set 222. Further, the application of a DC voltage to the exit lens 217 can facilitate the exit of the ions from the quadrupole rod set 222. Likewise, the input lens IQ3 and the exit lens 217 may be coupled to a RF power supply such that an RF signal may be applied thereto. For example, as shown in FIG. 2A, RF voltage source 207*b*, operating under the control of controller 209, can apply an RF signal to exit lens 217. It will be appreciated that the lenses IQ3 and 217 can be implemented in a variety of different ways. For example, in some embodiments, the lenses can be in the form of a plate having an opening through which the ions pass. In other embodiments, at least one (or both) of the lenses can be implemented as a mesh. As noted above, there can also be RF-only Brubaker lenses ST2, ST3 at the input and output ends of the quadrupole rod set 222.

As noted above, quadrupole assemblies in accordance with various aspects of the present teaching additionally include a plurality of auxiliary electrodes, which may comprise a collar electrode 230*c* and a plurality of linear accelerator (LINAC) electrodes 230*a,b* as shown in the exemplary quadrupole assembly 220 of FIGS. 2A-D. Generally, the auxiliary electrodes are electrically conductive (i.e., they can be made of any conductive material such as a metal or alloy) and can be coupled to one or more power supplies such that one or more electrical signals can be applied to each auxiliary electrode alone or in combination. Though the quadrupole assembly 220 depicted in FIG. 2A-D includes three auxiliary electrodes, more or fewer auxiliary electrodes can be utilized in accordance with the present teachings. For example, in various alternative embodiments, a collar electrode need not be provided and the plurality of auxiliary electrodes may just include a pair of LINAC electrodes 230*a,b*. Alternatively, for example, in some embodiments, four LINAC electrodes can be provided, each of which is interposed between rods of the quadrupole rod set.

Figure 2B:
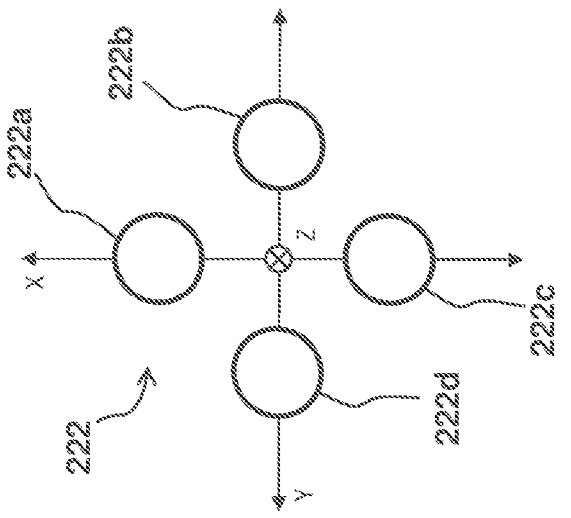
FIGS. 2B-D represent schematic cross-sections of the quadrupole assembly at the locations identified in FIG. 2A.
Figure 2C:
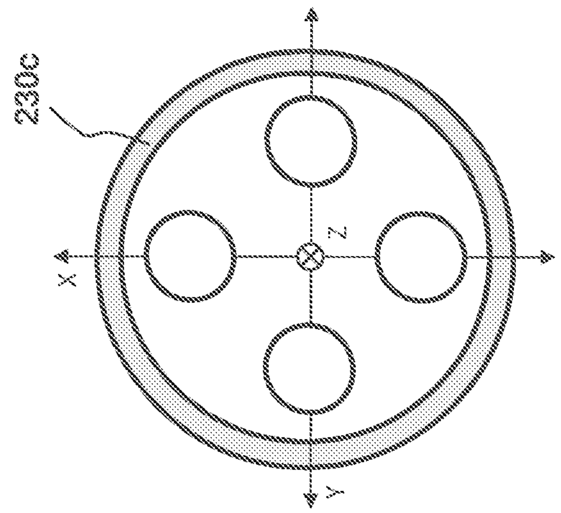

As shown in the cross-section of FIG. 2C, the collar electrode 230*c* surrounds the central portion of the quadrupole rod set 222 and may be coupled to a DC voltage source 208*e*, operating under the control of the controller 109, that can apply a DC voltage to the collar electrode 230*c* in order to aid in ion trapping and/or ejection as otherwise discussed herein. It will be appreciated that though the collar electrode 230*c* is depicted as being a cylindrical tube, the cross-sectional shape, size, and/or relative spacing of the collar electrode 230*c* may be varied in accordance with various aspects of the present teachings.

Figure 2D:
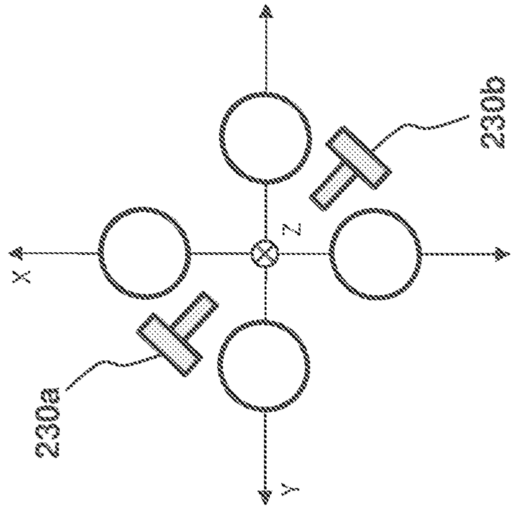

With specific reference now to FIG. 2A and the cross-section of FIG. 2D, the LINAC electrodes 230*a,b* extend along the longitudinal axis (Z) between the collar electrode 230*c* and the output end of the quadrupole rod set 222. As best shown in FIG. 2D, the LINAC electrodes 230*a,b* comprise a pair of T-shaped electrodes that are disposed on opposed sides of the longitudinal axis such that each of the LINAC electrodes 230*a,b* is interposed between a single rod of the first pair of rods 222*a,c* and a single rod of the second pair of rods 222*b,d*. As shown in FIG. 2A, the radial portion of the LINAC electrodes 230*a,b* tapers along the length of the quadrupole rod set 222. That is, the innermost surface of the LINAC electrode adjacent to the collar electrode 230*c* is separated from the longitudinal axis by a smaller distance than the innermost surface of the LINAC electrodes adjacent to the output end of the quadrupole rod set 222. As discussed below, upon the application of a DC voltage to the LINAC electrodes 230*a,b* (e.g., via DC voltage source 208*f*), this tapering establishes an electric field component along the axis (Z) that helps axially eject radially oscillating ions while the quadrupole assembly is operating in trapping mode. It will be appreciated that though the LINAC electrodes 230*a,b* are depicted as having a T-shaped cross-section, the cross-sectional shape, size, and/or relative spacing of the rods 230*a,b* may be varied as is known in the art. For example, in some aspects, the auxiliary electrodes 230*a,b* can comprise four rods having a circular cross-sectional area, with the rods being tilted (e.g., non-parallel relative to the central axis) such that the innermost surface of the electrodes 230*a,b* are further from the axis (Z) as they get closer to the output end of the quadrupole rod set 222.

Operation of Quadrupole Assembly in Transmitting Mode

As noted above, the quadrupole assembly 220 may be triggered (e.g., manually or automatically such as under the control of controller 209) to operate in transmitting mode. In some aspects, one of the transmitting and trapping mode may represent a default mode of operation, and which may be switched dependent on a selection by the user, based on a priori or empirical knowledge of a particular instrument, experiment and/or sample, and/or based on data obtained from a previous analysis, for example.

In transmitting mode (e.g., as an ion beam is being continuously transmitted into and through the quadrupole assembly 220), the application of the RF voltage(s) to the various rods 222*a-d* can result in the generation of a radially-confining quadrupolar field within the quadrupole assembly 220. In addition to the RF signal applied to the quadrupole rod set 222, in various aspects, the quadrupole rods 222*a-d* may additionally be coupled to the DC voltage sources 208*a* for applying a rod offset (RO) voltage and/or a resolving DC voltage (e.g., ±U as discussed above) so as to operate the rod set 222 such that only ions of chosen m/z ratios can be transmitted continuously from the input end to the output end. In various aspects, the controller 209 can additionally cause the voltage sources 208*e,f* to apply a DC voltage to the collar electrodes 230*c* and/or LINAC electrodes 230*a,b*, respectively, that is equivalent to the RO applied to the quadrupole rods 222*a-d* during transmitting mode. While the electric field within the quadrupole assembly 220 is generally a radially-confining quadrupolar field, it is also characterized by fringing fields in the vicinity of the input and the output ends of the quadrupole rod set 222. By way of example, diminution of the quadrupole potential in the regions in proximity of the output of the quadrupole rod set 222 can result in the generation of fringing fields, which can exhibit a component along the longitudinal direction of the quadrupole (along the z-direction). In some embodiments, the amplitude of this electric field can increase as a function of increasing radial distance from the longitudinal axis (Z) of the quadrupole rod set 222. As discussed in more detail below, such fringing fields can be utilized in accordance with the present teachings to couple the radial and axial motions of ions within the quadrupole assembly 220.

By way of illustration and without being limited to any particular theory, the application of RF voltage(s) to the quadrupole rods 222*a-d* can result in the generation of a two-dimensional quadrupole potential as defined in the following relation:

$$\varphi_{2D} = \varphi_0 \frac{x^2 - y^2}{r_0^2} \quad \text{Eq. (1)}$$

where, $\varphi_0$ represents the electric potential measured with respect to the ground, and x and y represent the Cartesian coordinates defining a plane perpendicular to the direction of the propagation of the ions (i.e., perpendicular to the z-direction). The electromagnetic field generated by the above potential can be calculated by obtaining a spatial gradient of the potential.

Again without being limited to any particular theory, to a first approximation, the potential associated with the fringing fields in the vicinity of the input and the output ends of the quadrupole rod set 222 may be characterized by the diminution of the two-dimensional quadrupole potential in the vicinity of the input and the output ends by a function $f(z)$ as indicated below:

$$\varphi_{FF}=\varphi_{2D}f(z) \quad \text{Eq. (2)}$$

where, $\varphi_{FF}$ denotes the potential associated with the fringing fields and $\varphi_{2D}$ represents the two-dimensional quadrupole potential discussed above. The axial component of the fringing electric field ($E_{z,quad}$) due to diminution of the two-dimensional quadrupole field can be described as follows:

$$E_{z,quad} = -\varphi_{2D}\frac{\partial f(z)}{\partial z} \quad \text{Eq. (3)}$$

As discussed in more detail below, such a fringing field allows the conversion of radial oscillations of ions that are excited via application of a voltage pulse to one or more of the quadrupole rods 222*a-d* to axial oscillations such that the axially oscillating ions can be detected by the detector 218.

With continued reference to FIG. 2A, the quadrupole assembly 220 can be coupled to a pulsed voltage source 208*c* for applying a voltage pulse to at least one of the quadrupole rods 222*a-d*. For example, the pulsed voltage source 208*c* can apply a dipolar voltage pulse to the first pair of rods 222*a,c*, though in other embodiments, the dipolar pulsed voltage can instead be applied to the second pair of rods 222*b,d*. Though the excitation pulse is generally described herein as being applied to one or more of the quadrupole rods 222*a-d*, in some alternative embodiments in accordance with various aspects of the present teachings, the pulsed voltage source 208*d* may instead be coupled to one or more of the auxiliary electrodes 230*a,b* such that an excitation pulse may be applied to the electrodes 230*a,b* (e.g., a positive voltage to the electrode 230*a* and a negative voltage to the electrode 230*b*), for example. In any event, ions passing through the quadrupole are normally exposed to only a single excitation pulse. Once the "slug" of excited ions passes through the quadrupole rod set 222 as discussed below, an additional excitation pulse may be triggered. This can occur every 1 to 2 ms such that about 500 to 1000 data acquisition periods are collected each second.

Without being limited to any particular theory, the application of the voltage pulse in transmitting mode (e.g., across two opposed quadrupole rods 222*a,c*) generates a transient electric field within the quadrupole assembly 220. The exposure of the ions within the quadrupole rod set 222 to this transient electric field can radially excite at least some of those ions at their secular frequencies. Such excitation can encompass ions having different mass-to-charge (m/z) ratios. In other words, the use of an excitation voltage pulse having a short temporal duration can provide a broadband radial excitation of the ions within the quadrupole rod set 222. As the radially excited ions reach the end portion of the quadrupole rod set 222 in the vicinity of the output end, they will interact with the exit fringing fields such that the radial oscillations of at least a portion of the excited ions can convert into axial oscillations, again without being limited to any particular theory.

Axially-oscillating ions can thus exit the quadrupole rod set 222 via the exit lens 217 to reach the detector 218 such that the detector 218 generates a time-varying ion signal in response to the detection of the axially-oscillating ions. It will be appreciated that a variety of detectors known in the art and modified in accordance with the present teachings can be employed. Some examples of suitable detectors include, without limitation, a conventional electron multiplier, which may be a conversion electrode or high energy dynode (HED) such as Photonis Channeltron Model 4822C and ETP electron multiplier Model AF610. Analysis of the time-varying signal generated by the detector 218 in response to detection of the axially-oscillating ions will be described in additional detail below with respect to the analysis module.

Figure 3:
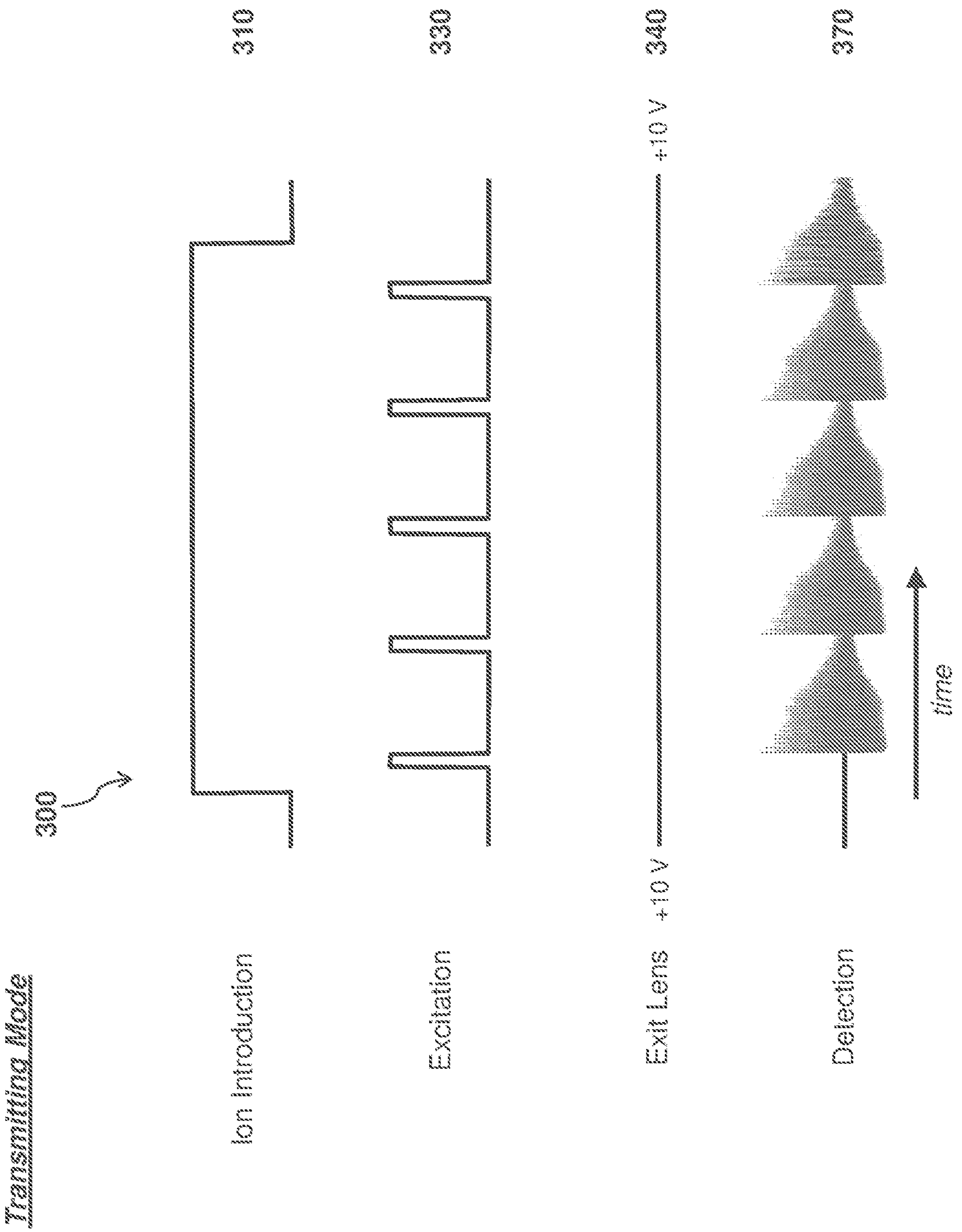
FIG. 3 is an exemplary series of timing diagrams that depict how the quadrupole assembly is controlled during transmitting mode in accordance with various embodiments.

FIG. 3 is an exemplary series 300 of timing diagrams that schematically depict how the quadrupole assembly 220 is controlled in transmitting mode, in accordance with various embodiments. Timing diagrams 310 and 330 show that ions are continuously received from an upstream analyzer (e.g., collision cell 116 of FIG. 1) during the application of five dipolar excitation pulses across the quadrupole assembly 220. As the ions are received within the quadrupole assembly 220, the application of RF voltage signals to the quadrupole rods 222 generate a radially-confining quadrupolar field such that ions that are stable at and below Mathieu parameter q=0.908 (i.e., when U=0) would be transmitted through the quadrupole rod set 222 without striking the rods 222*a-d*. In some additional aspects, it will be appreciated that by the suitable choice of the ratio of a resolving DC voltage applied to the rod set 222 and the amplitude of the RF signal applied to the rod set 222, the quadrupole assembly 220 can be configured as a mass filter that selectively transmits ions of a selected m/z range such that only a portion of ions received at the input end of the quadrupole assembly 220 would be transmitted therethrough without striking the rods 222*a-d*. In various aspects, the exit lens 217 can be maintained at a slightly attractive DC potential relative to the RO voltage applied to the rod set 222 via voltage source 208*c* operating under the control of the controller 209. By way of non-limiting example, for positive ions being transmitted through the quadrupole assembly 220 with the rod set 222 being maintained at a +20 V DC offset, the DC potential of the exit lens 217 can be less positive (e.g., more attractive, about +10 V DC) to the ions.

Without adjusting the exit lens voltage as in timing diagram 340, for example, each excitation pulse in timing diagram 330 may provide a broadband radial excitation of at least some of those ions being transmitted through the quadrupole assembly 220 at their secular frequencies. As shown in timing diagram 370, the first "slug" of radially-excited ions corresponding to the first excitation pulse interacts with the exit fringing fields such that the radial oscillations of at least a portion of the excited ions are converted into axial oscillations that are detected by detector 218 so as to generate the schematically-depicted time-varying oscillatory signal. Since a continuous ion beam is transmitted through the quadrupole assembly 220 when operating in transmitting mode, once the first oscillatory signal resulting from the first excitation pulse has died away, another excitation pulse can be triggered and another oscillatory signal acquired. For signals that last about 1 ms, approximately 1000 such traces can be acquired, or rather, data can be acquired at a 1 kHz acquisition rate.

Operation of Quadrupole Assembly in Trapping Mode

As opposed to the transmitting mode exemplified above, a controller in accordance with various aspects of the present teachings can alternatively trigger the quadrupole assembly to operate in a trapping mode through the application of various electric potentials with RF and/or DC components to the quadrupole rods, auxiliary electrodes, and/or associated lenses such that ions are first trapped in the quadrupole assembly prior to their excitation by a voltage pulse.

For example, with reference to FIG. 2A, ions received from an upstream analyzer (e.g., collision cell 116 of FIG. 1) may be trapped within the quadrupole assembly 220 by causing the voltage sources 207*a* and 208*a* to apply an RF voltage and a DC voltage, respectively, to the quadrupole rods 222*a-d*, for example, in order to generate a radially-confining quadrupolar field. It will be appreciated by a person skilled in the art that in some aspects, the offset (RO) DC voltage applied to the quadrupole rod set 222 can be more attractive to the ions being transmitted into the quadrupole assembly 220 relative to the entry lens IQ3 and/or exit lens 217 so as to generate a potential well away from the end electrodes. Additionally, in some aspects, one or more DC voltages may be applied to the plurality of auxiliary electrodes (e.g., by controlling voltage sources 208*e,f*). For example, the controller 209 may cause the voltage source 208*e* to apply a DC voltage to collar electrode 230*c* and the voltage source 208*f* to apply a DC voltage to the plurality of LINAC electrodes 230*a,b*. Moreover, in some aspects, at least one of an RF voltage and a DC voltage may be applied to the exit lens 217 (e.g., by controlling voltage sources 207*b* and 208*c*) to prevent ions from being transmitted downstream through the exit lens 217.

As will be appreciated by a person skilled in the art in light of the present teachings, the voltage signals applied to the various components utilized to trap ions within the quadrupole assembly 220 can be selected, for example, depending on the polarity of the ions of interest. For example, in order to trap positive ions in the quadrupole assembly 220 during filling and cooling, the controller 209 can cause: i) the voltage source 208*f* to apply a first DC LINAC voltage to the LINAC electrodes 230*a,b*; ii) the voltage source 208*e* to apply a first DC collar voltage to the collar electrode 230*c* that is more negative than the first DC LINAC voltage; and iii) the voltage source 208*c* to apply a first DC exit lens voltage to exit lens 217 that is more positive than the first DC LINAC voltage. In such circumstances, positive ions entering the quadrupole assembly 220 may be axially repelled from the exit lens 217 of the quadrupole assembly 220 because the collar electrode 230*c* and LINAC electrodes 230*a,b* generally provide a more attractive (negative) potential, while the RF signals applied to the quadrupole rods 222*a-d* provide radial confinement.

For the trapping of negative ions during filling and cooling, however, the controller 209 can instead cause: i) the voltage source 208*f* to apply a first DC LINAC voltage to the LINAC electrodes 330; ii) the voltage source 208*e* to apply a first DC collar voltage to collar electrode 230*c* that is more positive than the first DC LINAC voltage; and iii) cause the voltage source 208*c* to apply a first DC exit lens voltage to exit lens 217 that is more negative than the first DC LINAC voltage. As such, negative ions entering the quadrupole assembly 220 may be repelled from the downstream region of the quadrupole assembly 220 as the collar electrode 230*c* and/or the auxiliary electrodes 230*a,b* exhibit generally provide a more attractive (positive) potential.

Figure 4:
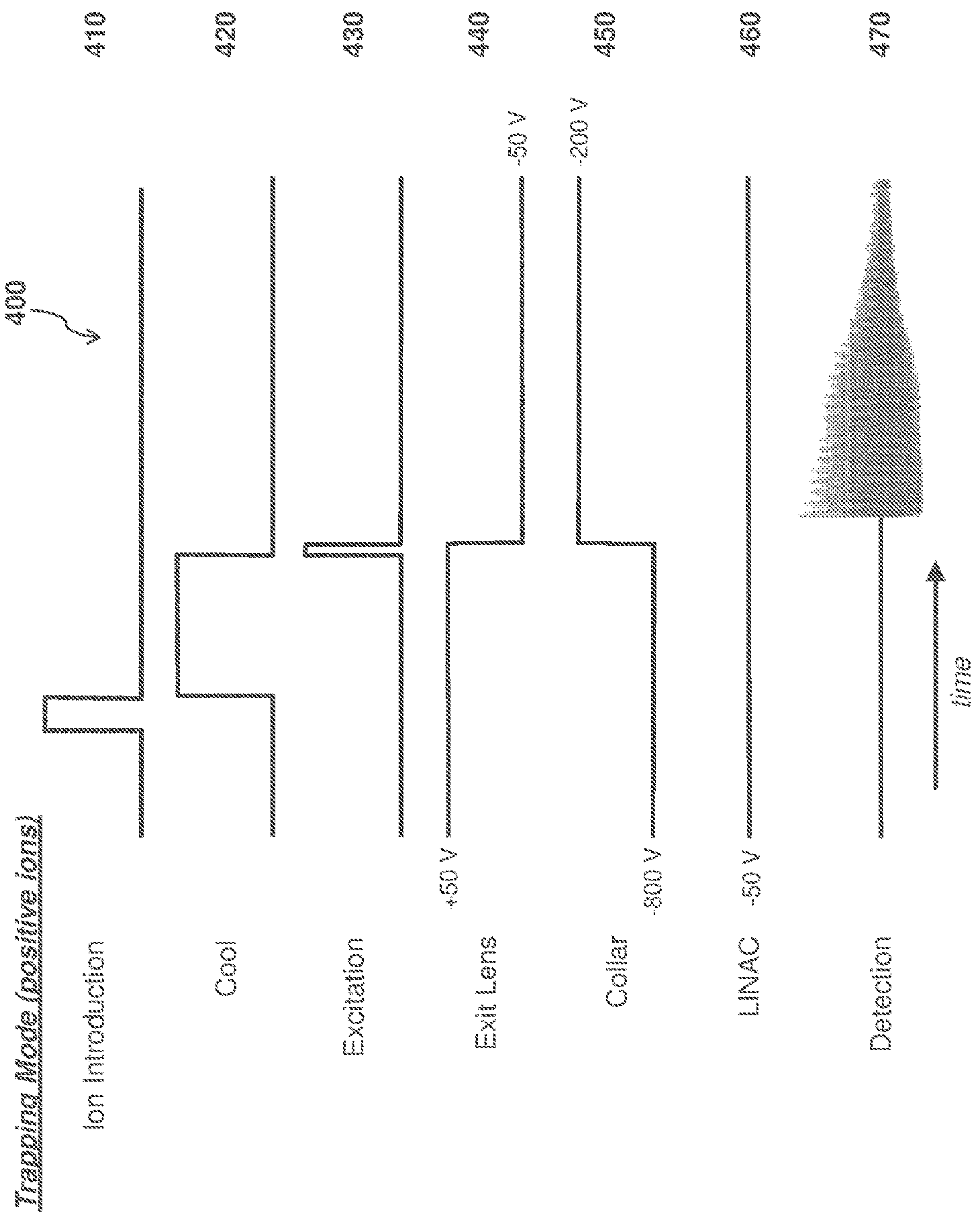
FIG. 4 is an exemplary series of timing diagrams that depict how the quadrupole assembly is controlled during trapping mode in accordance with various embodiments.

FIG. 4 is an exemplary series 400 of timing diagrams that schematically depict how the quadrupole assembly 220 is controlled in trapping mode in order to trap, excite, and eject positive ions, in accordance with various example embodiments of the present teachings. Timing diagram 410 shows that the positive ions (e.g., product ions and residual selected precursor ions) are introduced into the quadrupole assembly 220 over a period of time, which may be on the order of about 10 ms, for example. After the positive ions are introduced into the quadrupole assembly 220 or the quadrupole assembly 220 is filled with ions, the positive ions may be cooled for a period of time as indicated in timing diagram 420. This time period for ion cooling may be on the order of 50 ms, by way of non-limiting example. As shown schematically in timing diagrams 440, 450, and 450, during the ion introduction and cooling periods, the collar electrode 203*c* is be maintained at −800 V DC, while the LINAC electrodes 203*a,b* are maintained at −50 V DC and the exit lens 217 is maintained at +50 V DC. Additionally, in some aspects, an RF voltage can be applied to the exit lens 217 (and also entry lens IQ3) such that positive ions are alternatively attracted to and repelled from the exit lens 217. Though not shown in FIG. 4, it will also be appreciated that the application of RF voltage signals to the quadrupole rods 222 during the trapping and cooling may provide a radially-confining quadrupolar field such that ions are driven toward the central axis (Z). In this manner, positive ions entering the quadrupole assembly 220 can be prevented from being ejected through the exit lens 217. The cooling period may also slow down the ions as they oscillate radially across the Z-axis and axially along the Z-axis due to the influence of the alternating attractive/repulsive potentials of the RF signal applied to the end electrode(s).

It will be appreciated that the above conditions for trapping either positive or negative ions within the quadrupole assembly 220 is but one example of the control signals possible in accordance with the present teachings. As is known in the art, a potential well for the ions can be generated within the quadrupole rod set 222 without regard to the collar electrode 230*c* and/or auxiliary electrodes 230*a,b*, for example, by the selection of appropriate DC and/or RF voltages on the end electrodes (e.g., entry lens IQ3 and exit lens 217) to provide axial confinement, while the RF signals applied to the quadrupole rods 222*a-d* provide radial confinement. Offset (RO) DC voltages applied to the quadrupole rod set 222 can also be utilized to generate a potential well within the center of the quadrupole assembly (e.g., away from the end electrodes), depending, for example, on the DC potential at which the end electrodes are maintained.

In any event, ions that are prevented from exiting the downstream end through the exit lens 217 can in some aspects be subjected to higher operating gas pressures relative to gas pressures within the quadrupole assembly 220 during transmitting mode so as to aid in quickly cooling the ions through collisions with gas molecules. By way of non-limiting example, the background pressure for the quadrupole assembly 220 when in trapping mode can be reduced to be lower than when in transmitting mode, for example, in a range between about $0.5\times10^{-5}$ and $5\times10^{-4}$ Torr. In such aspects, the controller 209 can control pressure and/or gas flow rates provided by gas inlets and outlets depending on the operational mode. Once the ions are cooled, they can be excited.

In trapping mode, a coherent excitation is used to excite the trapped ions of the quadrupole assembly 220, and can be any short waveform excitation. In various embodiments, the short waveform excitation produces a short waveform with a sharp leading edge that rises in less than 10 μs, for example. The short waveform excitation can be, for example, a very narrow dipolar excitation pulse in which a positive DC voltage is applied to one rod of the quadrupole rod set 222 at the same time as a negative DC voltage of the same amplitude voltage is applied to another rod of the quadrupole rod set 222. In various aspects, a function generator can be used to produce an excitation pulse such as a square pulse exhibiting an amplitude of about 5 V and a width of between 0.5 to 5 μs, for example. An amplifier can also be used to provide an excitation pulse having an amplitude in the range of from about 5 V DC to 100 V DC from the 5 V input in a dipolar fashion using a toroidal transformer, for example. The dipolar excitation pulse can be applied between the X rods (i.e., rods 222*a,c* as shown in FIG. 2B) of the quadrupole rod set 222, for example. Alternatively, the excitation pulse can be applied across the quadrupole assembly by applying a dipolar pulse between the Y rods (i.e., rods 222*b,d* as shown in FIG. 2B) of the quadrupole rod set 222, or even between the auxiliary LINAC electrodes 230*a,b*.

In various embodiments, axial ejection of the coherently oscillated ions toward detector 218 can be accomplished by appropriately adjusting the voltages of the collar electrode 230*c* and LINAC electrodes 230*a,b* of the quadrupole assembly 220, as well as the voltages applied to the exit lens 217. Preferably, the detector 218 is configured to detect the ejected ions' oscillations fast enough to prevent the loss of coherence, but slow enough to provide the high resolution typical of Fourier transform mass spectrometry. In certain aspects of the present teachings, this desired rate of detection may be accomplished by axially ejecting coherently oscillating ions from the quadrupole assembly 220 at a precise rate, for example, by controlling the application of RF and/or DC potentials to the various components of the quadrupole assembly 220 and the exit lens 217 according to a precise timing sequence.

For example, the controller 209, in a coordinated fashion, can adjust the DC voltage of collar electrode 230*c* by controlling DC voltage source 208*e*, adjust the DC voltage of LINAC electrodes 230*a,b* by controlling DC voltage source 208*f*, and adjust the DC and RF voltages of exit lens 217 by controlling DC voltage source 208*c* and RF voltage source 207*b*, respectively.

With reference again to FIG. 4, timing diagram 430 depicts the narrow dipolar DC voltage excitation pulse used to oscillate the exemplary positive ions trapped in the quadrupole assembly 220. Because time and frequency are inversely proportional, a narrower excitation pulse in the time domain produces a wider frequency spectrum, which means that a wider m/z range of ions can be excited by the same pulse. As described above, the exemplary narrow dipolar DC voltage excitation pulse is applied between X rods (i.e., rods 222*a,c*) of the quadrupole rod set 222. The dipolar DC voltage excitation pulse of timing diagram 530 has an amplitude in the range of from about 5 V DC to 100 V DC and a width of between 1 and 5 μs, for example.

Again referring to FIG. 4, after the ions trapped in the quadrupole assembly 220 are excited by the excitation pulse in timing diagram 430, they are axially ejected by adjusting the voltages of the auxiliary electrodes 230*a-c* electrodes of the quadrupole assembly 200 and the exit lens 217 so as to meter out the ions of LIT over a period of time. As noted above, ejecting all of the ions at once may not provide a signal of sufficient duration to provide a high enough resolution.

For example, to eject the positive ions exemplified in FIG. 4, the controller 209 is configured to change the DC voltage of collar electrode 230*c* from the first DC collar voltage (e.g., −800 V DC) to a second DC collar voltage (e.g., −200 V DC) and change the DC voltage of exit lens 217 from the first DC exit lens voltage (e.g., +50 V DC) to a second exit lens voltage (e.g., −50 V DC), which is less negative than the first DC collar voltage but still more negative than the first LINAC voltage (e.g., −50 V DC). The second exit lens voltage is the same as the first LINAC voltage.

Timing diagram 440 shows the change in the DC voltage of the exit lens immediately after the excitation pulse. The change in the DC voltage of the exit lens 217 from +50 V to −50 V, for example, causes positive ions to be more attracted to the exit lens 217. This voltage, however, is still more positive than the second DC collar voltage of the collar electrode 230*c* so as to prevent all of the ions from immediately exiting the quadrupole 220.

Timing diagram 450 shows the change in the DC voltage of the collar electrode 230*c* immediately after the excitation pulse. The change in the DC voltage of the collar electrode 230*c* from −800 V to −200 V, for example, causes positive ions to be less attracted to the quadrupole assembly 220 and therefore more likely to be ejected. However, because −200 V is more attractive (negative) than the −50 V of the exit lens 217 for positive ions, a barrier remains so that the positive ions do not leave the quadrupole assembly 220 immediately.

Timing diagram 460 shows that the voltage of the LINAC electrodes 230*a,b* does not change in this exemplary embodiment, but instead remains at −50 V before and after the excitation pulse. Due to the tapering of the LINAC electrodes 230*a,c*, as shown in FIG. 2A, the LINAC electrodes 230*a,b* produce an axial electric field component, which accelerates the positive ions axially toward the exit lens 217. Because the DC voltage of the LINAC electrodes 230*a,b* does not change after the excitation pulse, the acceleration of ions takes place before and after the excitation pulse. However, ions are not ejected from the quadrupole assembly 220 before the excitation pulse because the voltage of the exit lens 217 is much more positive (e.g., +50 V DC) than the voltage of the LINAC electrodes (e.g., −50 V DC). After the excitation pulse, the adjustment to the voltage of the exit lens to the same voltage as the LINAC electrodes 230*a,b* (e.g., to −50 V DC) causes the positive ions to be ejected because there is no longer any voltage barrier for the ions accelerated by the axial electric field component generated by the LINAC electrodes.

Coherently oscillating ions are thus axially ejected from the quadrupole assembly through the exit lens 240 for detection (e.g., destructive detection) by the detector 218 and the schematically-depicted time-varying oscillatory signal as shown in timing diagram 470.

Analysis Module

An exemplary analysis module 209*a* as depicted in FIG. 2A may be associated with the controller 209 to receive the detected time-varying signal from the detector 218 and operate on that signal to generate a mass spectrum associated with the detected ions. More specifically, as shown in FIG. 5A-D, the analysis module 209*a* can receive a time-varying signal (like that exemplary signal of FIG. 5A) and obtain a Fourier transform thereof to generate a frequency-domain signal (as in FIG. 5B). The analyzer can then convert the frequency domain signal (FIG. 5B) into a mass spectrum (FIG. 5C) using the relationships between the Mathieu parameters a and q and the ion's m/z.

$$a_x = -a_y = \frac{8zU}{\Omega^2 r_0^2 m} \quad \text{Eq. (4)}$$

$$q_x = -q_y = \frac{4zV}{\Omega^2 r_0^2 m} \quad \text{Eq. (5)}$$

where z is the charge on the ion, U is the resolving DC voltage on the rods, V is the RF voltage amplitude, Ω is the angular frequency of the RF, and $r_0$ is the characteristic dimension of the quadrupole. The radial coordinate r is given by the equation:

$$r^2 = x^2 + y^2 \quad \text{Eq. (6)}$$

In addition, when parameter q<~0.4, the parameter β is given by the equation:

$$\beta^2 = a + \frac{q^2}{2} \quad \text{Eq. (7)}$$

and the fundamental secular frequency is determined as follows:

$$\omega = \frac{\beta\Omega}{2} \quad \text{Eq. (8)}$$

Under the condition where parameter a=0 and parameter q<~0.4, the secular frequency is related to the particular ion's m/z by the approximate relationship below:

$$\frac{m}{z} \sim \frac{2}{\sqrt{2}} \frac{V}{\omega\Omega r_0^2} \quad \text{Eq. (9)}$$

The exact value of β is a continuing fraction expression in terms of the a and q Mathieu parameters. This continuing fraction expression can be found in the reference J. Mass Spectrom. Vol 32, 351-369 (1997), which is herein incorporated by reference in its entirety.

The relationship between m/z and secular frequency can alternatively be determined through fitting a set of frequencies to the equation:

$$\frac{m}{z} = \frac{A}{\omega} + B \quad \text{Eq. (10)}$$

where, A and B are constants to be determined.

With the time-varying signal generated by the detector 218 transformed, the generated frequency-domain signal thus contains information regarding the m/z distribution of ions within the ion beam that were excited at their secular frequency as a result of the application of the voltage pulse in either the transmitting or trapping mode as discussed above. Such information can be presented in a plot as shown in FIG. 6C, for example, known as a "mass spectra" that depicts the signal intensity at each m/z (indicative of the number of ions of that particular m/z that were sufficiently excited so as to enable detection).

In the exemplary embodiment of FIG. 5A-D, FIGS. 5A-C exemplify the results of applying an excitation pulse while operating in transmitting mode as discussed above. With specific reference to the mass spectra of FIG. 5C, it will be appreciated that the peaks representing ions of higher m/z exhibit a decreased resolution (e.g., wider peak shape) relative to peaks of lower m/z. In accordance with various aspects of the present teachings, the analyzer 209*a* may calculate a resolution of one or more of these peaks, for example, using the formula:

$$\text{Resolution} = \frac{m/z}{\Delta(m/z)} \quad \text{Eq. (11)}$$

As is known in the art, Δ(m/z) may represent the peak width at a specified percentage of peak height. By way of example, it is common to determine Δ(m/z) for a particular m/z at 50% of the peak height (i.e., full-width half-maximum (FWHM)), though any other known techniques for determining resolution may be utilized. In various aspects, the calculated resolution of one or more peaks of the generated mass spectrum in one operational mode may be utilized to determine if the quadrupole assembly may be switched to operate in the other of the transmitting or trapping mode, for example, by comparing the calculated resolution to a threshold (e.g., a default threshold, a threshold selected by a user). In some embodiments, a quadrupole assembly according to the present teachings can be employed to generate mass spectra with a resolution in a range of about 100 to about 1000, and can be triggered to operate, for example, if the determined resolution is below a threshold (e.g., below 100, below 500).

Figures 5A, 5B, 5C, 5D:
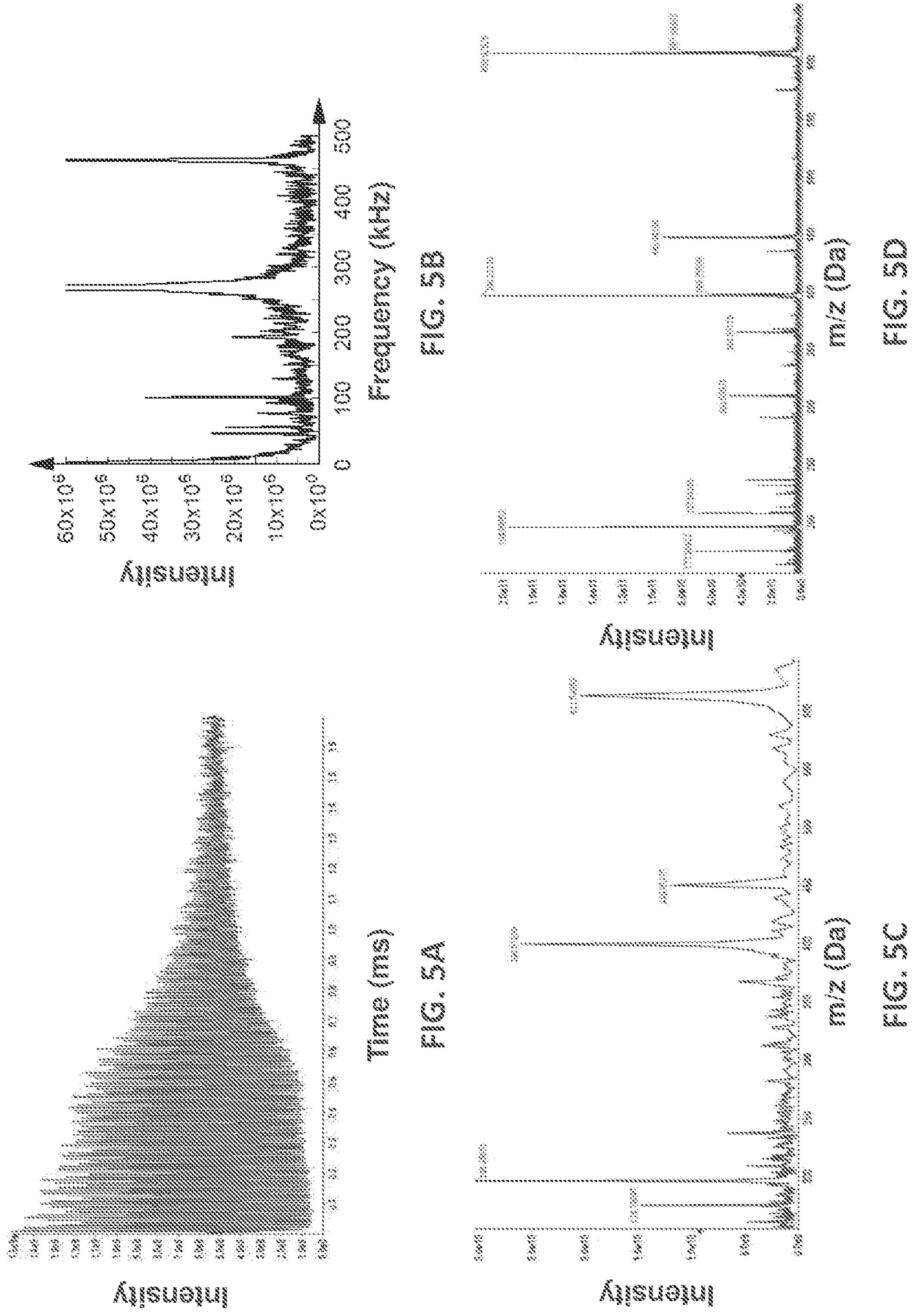
FIG. 5A exemplifies a time-varying signal obtained in transmitting mode, with FIGS. 5B and 5C corresponding to the frequency-domain and mass spectrum derived therefrom in accordance with various embodiments.
FIG. 5D exemplifies the mass spectrum generated from the same sample but while operating the quadrupole assembly in trapping mode.

The following examples are provided for further elucidation of various aspects of the present teachings, and are not intended to necessarily provide the optimal ways of practicing the present teachings or the optimal results that can be obtained. With reference to the exemplary mass spectrum of FIG. 5C (which can be derived from a time-varying signal like that of FIG. 5A), the mass spectrum was obtained using a modified 4000 QTRAP® in which opposed quadrupole rods of Q3 were coupled to a pulsed voltage source configured to provide a dipolar excitation signal thereto. Ions were generated from a sample containing 0.17 pmol/μL reserpine solution by a nebulizer-assisted electrospray ion source (not shown). The reserpine ions (m/z 609) were selected in Q1, fragmented in a collision cell q2, and were subject to a dipolar voltage pulse (1 V DC, 0.5 μs) as the product ions and non-fragmented precursor ions from q2 were transmitted through the modified Q3. As shown in FIG. 5C, the peak widths increase with increasing m/z: 195+ has a FWHM of 0.90 amu, 397+ is measured at 2.7 amu, and 609+ is 5.9 amu. In accordance with various aspects of the present teachings, the analysis module 209*a* may determine that one or more of the peaks representing the ions of higher m/z is of insufficient resolution such that the controller can switch the quadrupole assembly to instead operate in trapping mode. FIG. 5D represents a mass spectrum obtained from the same sample as FIG. 5C following such a switch to trapping mode. As with FIG. 5C, the reserpine ions (m/z 609) were selected in Q1 and fragmented in collision cell q2, but were trapped in Q3 (and cooled for 50 ms) prior to the application of a dipolar voltage pulse (3 V DC, 1.0 μs). It will be appreciated that the sharper peaks in the mass spectrum of FIG. 5D indicate an increased resolution relative to FIG. 5C, particularly for those ions of higher m/z. As shown in FIG. 5D, the product ion of m/z 195+ has a FWHM of 0.11 amu, 397+ is measured at 0.25 amu, and 609+ is 0.44 amu, each of which is a substantial improvement in resolution relative to the corresponding ion in the more rapid acquisition of FIG. 5C.

Figure 6:
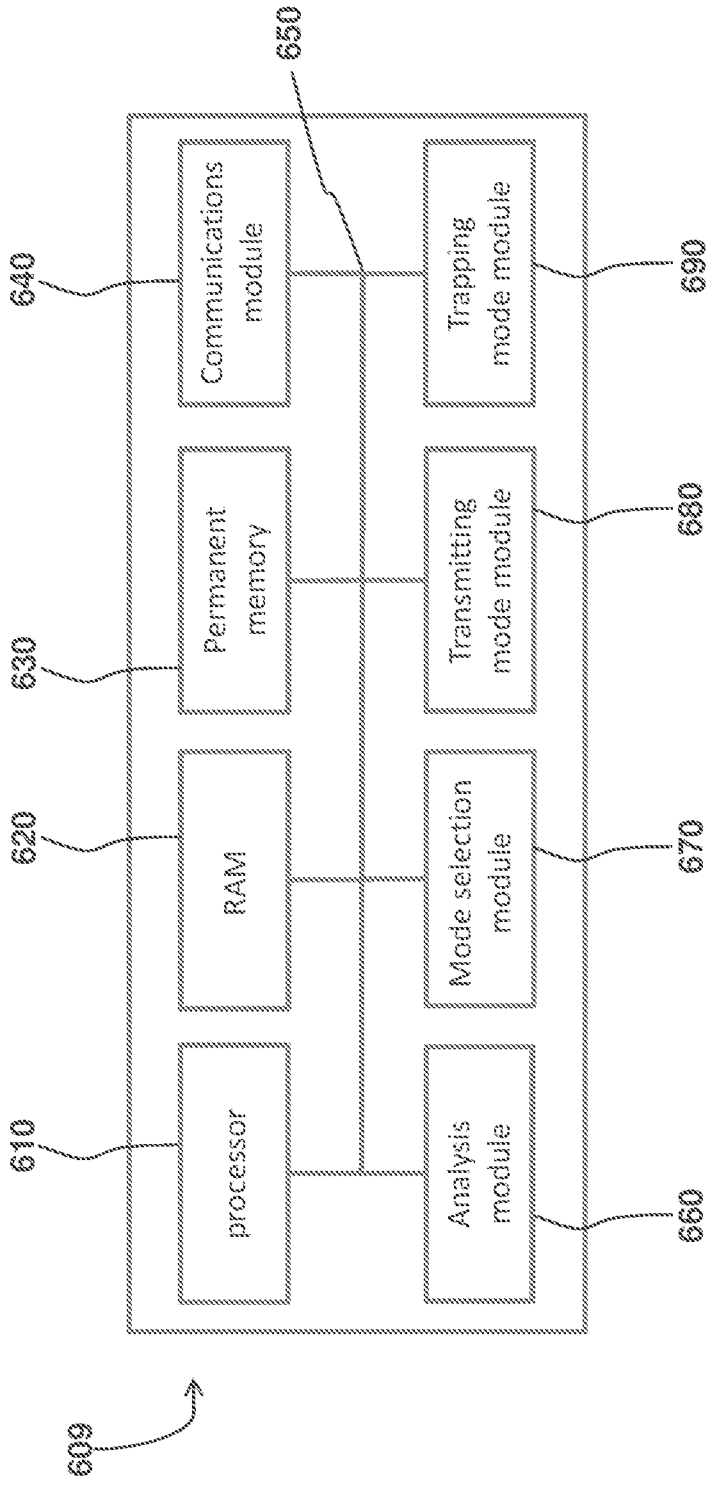
FIG. 6 schematically depicts an exemplary implementation of a controller suitable for use with a quadrupole assembly in accordance with various aspects of applicant's teachings.

The controller (e.g., controller 109 of FIG. 1) can be implemented in hardware and/or software in a variety of different ways. By way of example, FIG. 6 schematically depicts an embodiment of a controller 609, which includes a processor 610 for controlling the operation of its various modules utilized to perform analysis in accordance with the present teachings. As shown, the controller 609 includes a random-access memory (RAM) 620 and a permanent memory 630 for storing instructions and data. A communications module 640 allows the controller 609 to communicate with a detector (e.g., detector 118 of FIG. 1), for example, to receive the detected ion signal, and communicate with the various electrodes, lenses, and/or power supplies as described otherwise herein. A communications bus 650 allows various components of the controller 609 to communicate with one another.

The controller 609 also includes an analysis module 660 for transforming the time-varying ion signal received from a detector (e.g., via Fourier transform) into a frequency domain signal, and for calculating the mass spectrum of the detected ions based on the frequency domain signal as otherwise discussed herein. An operational mode selection module 670 is utilized to select the operational mode of the quadrupole assembly, for example, whether to operate the quadrupole assembly in transmitting mode or trapping mode. Depending on the operational mode (e.g., as determined by the operational mode selection module 670), a quadrupole assembly in accordance with the present teachings can be operated in one of transmitting mode or trapping mode, with the respective transmitting mode module 680 or trapping mode module 690 operating the quadrupole assembly and/or exit lens, for example, by controlling the application of RF and/or DC potentials to the various components according to the appropriate timing sequence as otherwise discussed herein.

Figure 7:
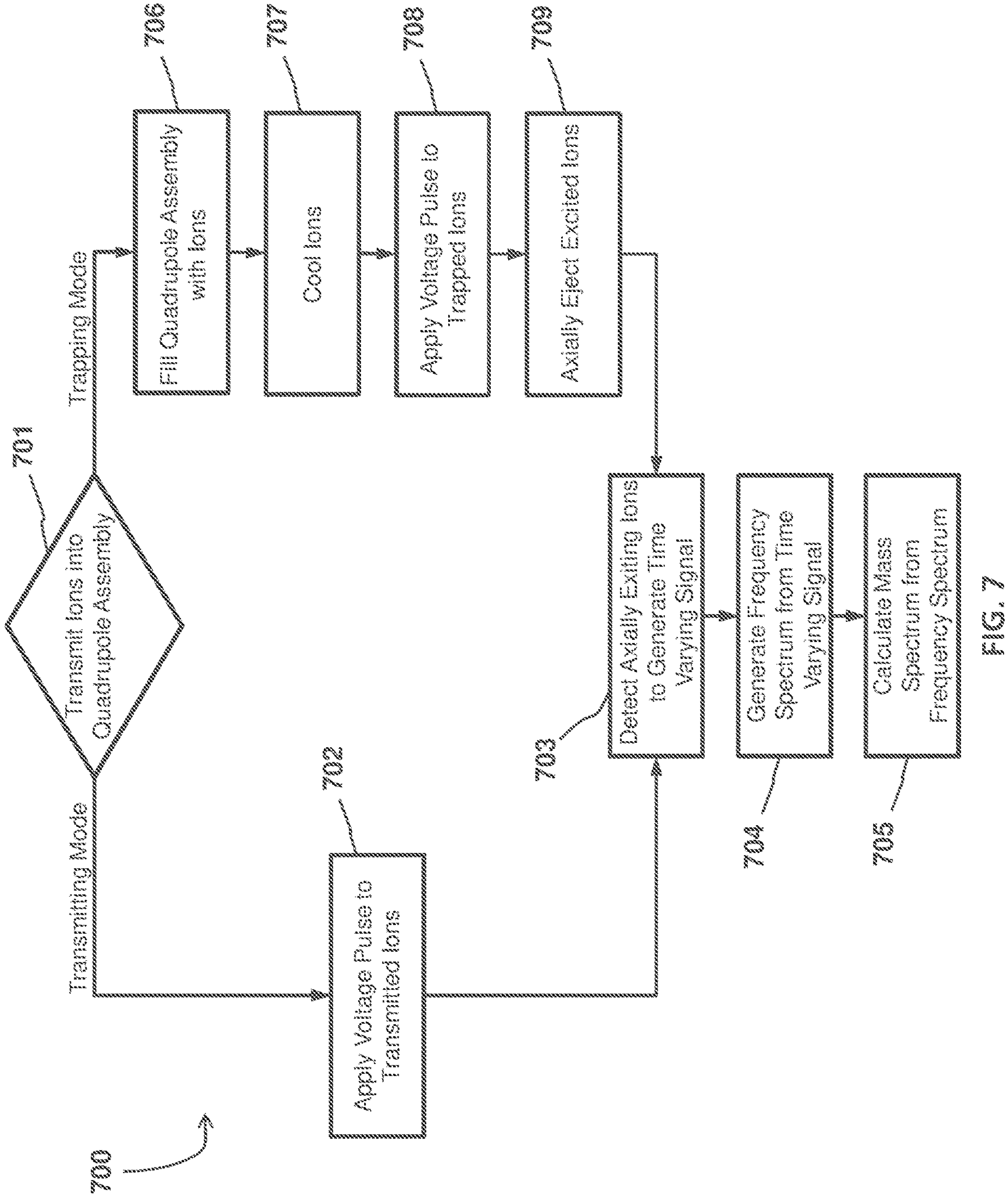
FIG. 7 depicts an exemplary method of operating a mass spectrometer system in accordance with various aspects of applicant's teachings.

An exemplary method 700 of operating (e.g., via controller 609 of FIG. 6) a mass spectrometer system in accordance with various aspects of the present teachings is depicted in FIG. 7. In step 701, ions are transmitted into the quadrupole assembly. Depending on the operational mode, ions are either continuously transmitted through the quadrupole assembly as the excitation pulse is applied (transmitting mode) or trapped within the quadrupole assembly before the excitation pulse is applied thereto (trapping mode). As noted above, the controller can trigger the quadrupole assembly to operate in an operational mode based on a selection by the user, based on a priori or empirical knowledge of a particular instrument, experiment and/or sample, and/or based on data obtained from a previous analysis (e.g., data provided by analysis module 660 of FIG. 6). With reference first to transmitting mode, in step 702, ions can be transmitted through the quadrupole assembly without trapping ions by applying at least one radio frequency (RF) voltage to each of the rods of the quadrupole rod set so as to generate a field for radial confinement of the ions and a voltage pulse can be applied across the quadrupole assembly so as to excite radial oscillations of at least a portion of the ions at secular frequencies thereof. The ions excited in transmitting mode interact with the fringing fields in proximity to the output end of the quadrupole assembly and convert the radial oscillations into axial oscillations as the excited ions exit the quadrupole assembly. In step 703, the detector detects the axially oscillating ions to generate a time-vary signal. A frequency spectrum is determined from the time-varying signal (step 704) such that a mass spectrum can be calculated therefrom (step 705).

In trapping mode, however, the quadrupole assembly is first filled with ions in step 706, for example, through the application of DC and RF pulses to the various components of the quadrupole assembly such that ions transmitted into the trap are prevented from exiting through the output end as otherwise discussed herein. In step 707, the trapped ions may optionally be cooled for a period of time, and optionally, with the provision of a gas flow to collisionally cool the ions within the quadrupole assembly. Thereafter, in step 708, a voltage pulse can be applied across the quadrupole assembly so as to excite radial oscillations of the trapped ions. In step 703, the ions excited in trapping mode are axially ejected, for example, by applying a coordinated sequence of DC and RF voltage signals to various components of the quadrupole assembly and its associated exit lens as otherwise discussed herein. A detector detects the axially ejected ions in step 704, and a frequency spectrum is determined from the time-varying signal (step 705). A mass spectrum can then be calculated therefrom (step 706).

Figure 8:
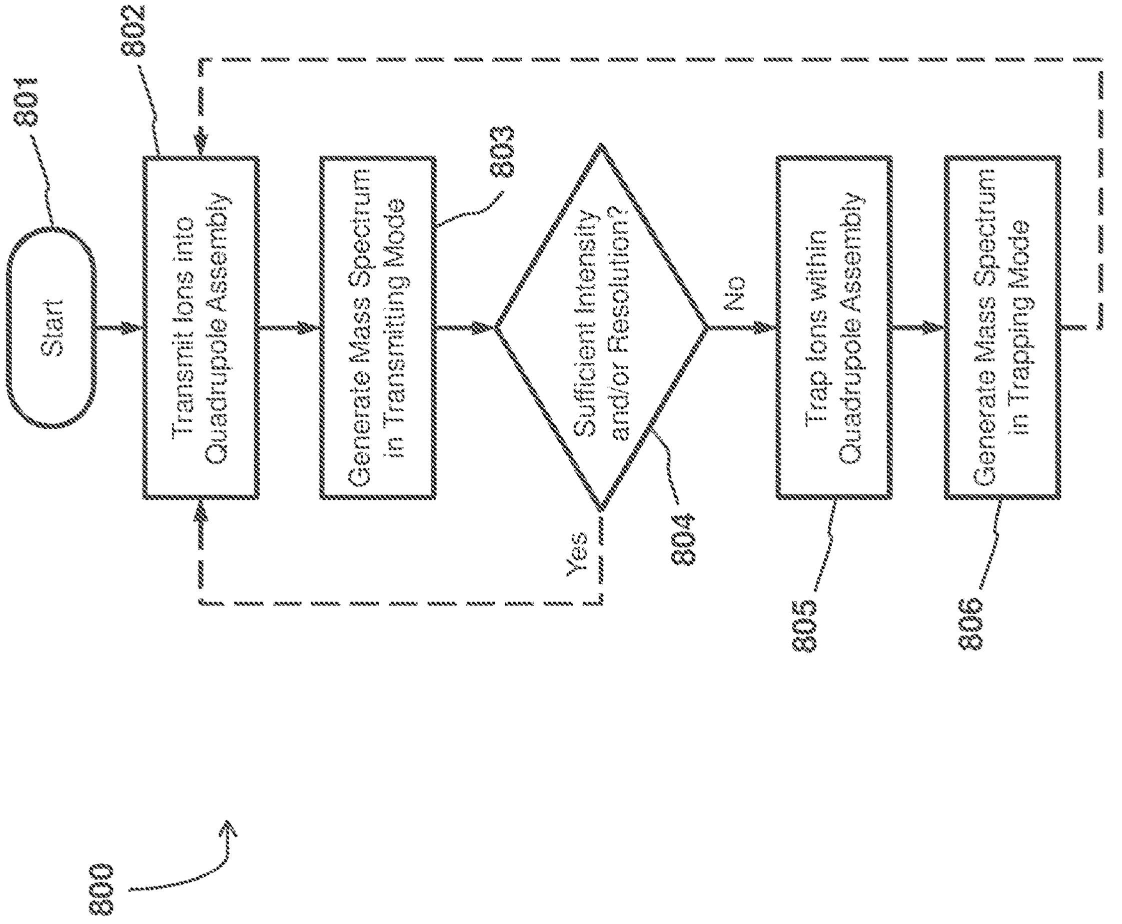
FIG. 8 depicts another exemplary method of operating a mass spectrometer system in accordance with various aspects of applicant's teachings.

Another exemplary method 800 of operating (e.g., via controller 609 of FIG. 6) a mass spectrometer system in accordance with various aspects of the present teachings is depicted in FIG. 8 in which the quadrupole assembly is initiated to operate in transmitting mode (e.g., by default, according to the selection of a user) in step 801. In step 802, ions are transmitted into the quadrupole assembly. Operating in transmitting mode, a voltage pulse is applied to the transmitted ions that detection of the excited can be used to generate a mass spectrum as otherwise discussed herein (step 803). The resulting mass spectrum can then be analyzed (e.g., by an analysis module) or presented to the user for confirmation that the mass spectrum generated in transmitting mode is of sufficient intensity and/or resolution in step 804. If so, one or more additional "slugs" of the continuous ion beam can be analyzed. If, however, the intensity and/or resolution of the mass spectrum in transmitting mode is not sufficient, the quadrupole assembly can be switched to trapping mode such that additional ions are transmitted into the quadrupole (step 805), where they be trapped, cooled, excited, and axially ejected therefrom so as to generate a mass spectrum in trapping mode (step 806) as otherwise discussed herein. As suggested in FIG. 8, after obtaining data in trapping mode, for example, the quadrupole assembly can revert to the more rapid data acquisition associated with the transmitting mode.

Those having ordinary skill in the art will appreciate that various changes can be made to the above embodiments without departing from the scope of the invention. Further, one of ordinary skill in the art would understand that the features of one embodiment can be combined with those of another.

What is claimed is:

1. A method of performing mass analysis comprising:

transmitting a plurality of ions into a quadrupole assembly comprising a quadrupole rod set and a plurality of auxiliary electrodes, said quadrupole rod set comprising an input end for receiving the ions and an output end through which ions exit the quadrupole rod set, wherein an exit lens is disposed adjacent the output end of the quadrupole rod set;

triggering the quadrupole assembly to operate in one of a transmitting mode and a trapping mode;

generating a mass spectrum for at least a portion of the plurality of ions on which a voltage pulse was applied in the triggered mode to cause radial oscillation of the at least the portion of the plurality of ions; and determining a subsequent operation mode, selected from the transmitting mode and the trapping mode, based on an analysis of the generated mass spectrum that includes determination of resolution of one or more peaks of the generated mass spectrum for the at least the portion of the radially oscillating plurality of ions;

wherein in the transmitting mode and during said step of transmitting the ions into the quadrupole assembly, the method comprises:

transmitting the ions through the quadrupole assembly without trapping ions therein by applying at least one radio frequency (RF) voltage to each of the rods of the quadrupole rod set so as to generate a field for radial confinement of the ions; and applying a voltage pulse across the quadrupole assembly so as to excite radial oscillations of the at least the portion of the ions being transmitted through the quadrupole at secular frequencies thereof, wherein fringing fields in proximity to said output end convert said radial oscillations of at least a portion of said excited ions into axial oscillations as said excited ions exit the quadrupole rod set;

wherein in the trapping mode, the method further comprises:

trapping the ions transmitted into the quadrupole assembly by applying i) at least one direct current (DC) voltage and at least one RF voltage to each of the quadrupole rods of the quadrupole rod set, ii) one or more DC voltages to the plurality of auxiliary electrodes, and iii) a DC voltage and an RF voltage to the exit lens during said step of transmitting the ions into the quadrupole assembly;

applying the voltage pulse across the quadrupole assembly so as to excite radial oscillations of the at least the portion of the ions trapped within the quadrupole assembly at secular frequencies thereof; and axially ejecting the excited ions from the quadrupole rod set; and detecting at least a portion of said excited ions exiting the quadrupole rod set operating in one of said transmitting mode and trapping mode to generate a time-varying signal.

2. The method of claim 1, further comprising obtaining an analytical spectrum of the ions exiting the quadrupole rod set from the time-varying signal.

3. The method of claim 2, wherein obtaining the analytical spectrum comprises performing a Fourier transform of said time-varying signal so as to generate a frequency-domain signal containing information of the ions excited by the voltage pulse.

4. The method of claim 1, wherein determining the subsequent operation mode further comprises switching the quadrupole assembly from the transmitting mode to the trapping mode.

5. The method of claim 4, wherein the quadrupole assembly is switched from the transmitting mode to the trapping mode in an instance in which the intensity of at least one ion of one or more particular m/z in the analytical spectrum is below a threshold.

6. The method of claim 4, wherein the quadrupole assembly is switched from the transmitting mode to the trapping mode in order to increase the resolution of the analytical spectrum;

optionally, wherein the quadrupole assembly is switched from the transmitting mode to the trapping mode in an instance in which the FWMH of at least one ion of one or more particular m/z in the analytical spectrum is above a threshold.

7. The method of claim 1, wherein the quadrupole rod set comprises a first pair of rods and a second pair of rods extending along a central longitudinal axis from the input end to the output end, wherein the rods of the quadrupole rod set are spaced apart from the central longitudinal axis such that the rods of each pair are disposed on opposed sides of the central longitudinal axis, and wherein the plurality of auxiliary electrodes comprise a pair of auxiliary electrodes extending along the central longitudinal axis on opposed sides thereof, wherein each of the auxiliary electrodes is interposed between a single rod of the first pair of rods and a single rod of the second pair of rods.

8. The method of claim 7, wherein applying the voltage pulse across the quadrupole assembly comprises applying the voltage pulse across the rods of one of the first and second pairs of the quadrupole rod set;

wherein applying the voltage pulse across the quadrupole assembly comprises applying the voltage pulse across the auxiliary electrodes.

9. The method of claim 7, wherein the pair of auxiliary electrodes comprise linear accelerator (LINAC) electrodes.

10. The method of claim 7, wherein the plurality of electrodes further comprises a collar electrode surrounding the quadrupole rod set and disposed between the input end and the pair of auxiliary electrodes.

11. The method of claim 1, wherein in trapping mode, the method further applying a pressure and gas flow within the quadrupole assembly to cool the ions trapped therein.

12. A mass spectrometer system, comprising:

an ion source for generating a plurality of ions;

a quadrupole assembly comprising a quadrupole rod set and a plurality of auxiliary electrodes, said quadrupole rod set comprising an input end for receiving the ions and an output end through which ions exit the quadrupole rod set;

an exit lens disposed adjacent the output end of the quadrupole rod set;

one or more power supplies coupled to the quadrupole assembly;

a detector for detecting at least a portion of the plurality of ions exiting the quadrupole rod set so as to generate a time-varying signal; and a controller configured to:

trigger the quadrupole assembly to operate in one of a transmitting mode and a trapping mode;

generate a mass spectrum for the at least the portion of the plurality of ions on which a voltage pulse was applied in the triggered mode to cause radial oscillation of the at least the portion of the plurality of ions; and determining a subsequent operation mode, selected from the transmitting mode and the trapping mode, based on an analysis of the generated mass spectrum that includes determination of resolution of one or more peaks of the generated mass spectrum for the at least the portion of the radially oscillating plurality of ions;

wherein in the transmitting mode, the controller is further configured to:

control the one or more power supplies to apply at least one radio frequency (RF) voltage to each of the rods of the quadrupole rod set so as to generate a field for radial confinement of the ions to transmit the ions through the ions through the quadrupole assembly without trapping the ions therein; and control the one or more power supplies to apply a voltage pulse across the quadrupole assembly so as to excite radial oscillations of at least a portion of the ions being transmitted through the quadrupole at secular frequencies thereof, wherein fringing fields in proximity to said output end convert said radial oscillations of at least a portion of said excited ions into axial oscillations as said excited ions exit the quadrupole rod set;

wherein in the trapping mode, the controller is further configured to:

control the one or more power supplies to apply i) at least one direct current (DC) voltage and at least one RF voltage to each of the quadrupole rods of the quadrupole rod set, ii) one or more DC voltages to the plurality of auxiliary electrodes, and iii) a DC voltage and an RF voltage to the exit lens so as to trap the ions within the quadrupole assembly;

control the one or more power supplies to apply a voltage pulse across the quadrupole assembly so as to excite radial oscillations of at least a portion of the ions trapped within the quadrupole assembly at secular frequencies thereof;

control the one or more power supplies to axially eject the excited ions from the quadrupole rod set; and generate an analytical spectrum of the ions exiting the quadrupole rod set from the time-varying signal in either the transmitting mode or the trapping mode.

13. The system of claim 12, wherein the controller is configured to perform a Fourier transform of said time-varying signal so as to generate a frequency-domain signal containing information of the ions excited by the voltage pulse in either the transmitting mode or the trapping mode.

14. The system of claim 13, further comprising at least one gas inlet and at least one gas outlet, the controller further configured to control the gas inlet and gas outlet to adjust a pressure and gas flow within the quadrupole assembly;

optionally, wherein the controller is configured to control the gas inlet and gas outlet to maintain the quadrupole assembly at a pressure in the range of about $0.5\times10^{-5}$ to about $5\times10^{-5}$ to cool the ions within the quadrupole assembly while in trapping mode.

15. The system of claim 12, wherein the controller is configured to switch the quadrupole assembly from the transmitting mode to the trapping mode based on the analytical spectrum.

16. The system of claim 15, wherein the controller is configured to switch the quadrupole assembly from the transmitting mode to the trapping mode in an instance in which the intensity of at least one ion of one or more particular m/z in the analytical spectrum is below a threshold.

17. The system of claim 15, wherein the controller is configured to switch the quadrupole assembly from the transmitting mode to the trapping mode in order to increase the resolution of the analytical spectrum;

optionally, wherein the controller is configured to switch the quadrupole assembly from the transmitting mode to the trapping mode in an instance in which the FWMH of at least one ion of one or more particular m/z in the analytical spectrum is above a threshold.

18. The system of claim 12, wherein the quadrupole rod set comprises a first pair of rods and a second pair of rods extending along a central longitudinal axis from the input end to the output end, wherein the rods of the quadrupole rod set are spaced apart from the central longitudinal axis such that the rods of each pair are disposed on opposed sides of the central longitudinal axis, and wherein the plurality of auxiliary electrodes comprise a pair of auxiliary electrodes extending along the central longitudinal axis on opposed sides thereof, wherein each of the auxiliary electrodes is interposed between a single rod of the first pair of rods and a single rod of the second pair of rods.

19. The system of claim 18, wherein, in either the transmitting mode or trapping mode, the controller is configured to control the one or more power supplies to apply a voltage pulse across the rods of one of the first and second pairs of the quadrupole rod set;

wherein, in either the transmitting mode or trapping mode, the controller is configured to control the one or more power supplies to apply the voltage pulse across the auxiliary electrodes.

20. The system of claim 18, wherein the pair of auxiliary electrodes comprise linear accelerator (LINAC) electrodes;

wherein the plurality of electrodes further comprises a collar electrode surrounding the quadrupole rod set and disposed between the input end and the pair of auxiliary electrodes.

* * * * *